United States Patent
Sato et al.

(10) Patent No.: US 8,744,178 B2
(45) Date of Patent: Jun. 3, 2014

(54) INFORMATION PROCESSING APPARATUS, INFORMATION PROCESSING METHOD AND PROGRAM

(75) Inventors: Tatsuhito Sato, Kanagawa (JP);
Shunichi Kasahara, Kanagawa (JP);
Takaomi Kimura, Tokyo (JP);
Tomohiko Gotoh, Kanagawa (JP);
Daisuke Mochizuki, Chiba (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 13/049,513

(22) Filed: Mar. 16, 2011

(65) Prior Publication Data

US 2011/0274346 A1 Nov. 10, 2011

(51) Int. Cl.
*G06K 9/00* (2006.01)
(52) U.S. Cl.
USPC .......................................... 382/165; 382/170
(58) Field of Classification Search
USPC .................. 382/162, 165, 168, 170, 224, 305
See application file for complete search history.

(56) References Cited

U.S. PATENT DOCUMENTS

| 2010/0030578 A1* | 2/2010 | Siddique et al. ................... 705/3 |
| 2011/0035404 A1* | 2/2011 | Morgan et al. ................ 707/769 |
| 2011/0190913 A1* | 8/2011 | Van De Sluis et al. .......... 700/94 |

FOREIGN PATENT DOCUMENTS

| JP | 2004-185647 | 7/2004 |
| JP | 2007-121457 | 5/2007 |
| JP | 2008-53775 | 3/2008 |
| WO | WO 2007/114939 | 10/2007 |

\* cited by examiner

*Primary Examiner* — Phuoc Tran
(74) *Attorney, Agent, or Firm* — Finnegan, Henderson, Farabow, Garrett & Dunner, LLP

(57) ABSTRACT

There is provided an information processing apparatus including a storage unit in which a color arrangement database recording correspondences between color arrangement information about a combination of colors and a color arrangement mood concerning an atmosphere provided by the combination of colors is stored and a color arrangement mood analysis unit that analyzes the input color arrangement information based on the color arrangement database to determine the color arrangement mood corresponding to the combination of colors represented by the input color arrangement information.

7 Claims, 32 Drawing Sheets

FIG. 5

| COLOR ARRANGEMENT MOOD | COLOR ARRANGEMENT PATTERN ID | COLOR INDEX | RGB VALUE | AREA RATIO |
|---|---|---|---|---|
| RELAX | COL_RELAX_01 | 1 | (240, 250, 215) | 50 |
| | | 2 | (215, 240, 107) | 50 |
| | COL_RELAX_02 | 1 | (250, 230, 170) | 20 |
| | | 2 | (220, 241, 234) | 20 |
| | | 3 | (250, 192, 211) | 40 |
| | | 4 | (255, 242, 170) | 20 |
| HAPPY | COL_HAPPY_01 | 1 | (254, 230, 145) | 30 |
| | | 2 | (255, 220, 165) | 40 |
| | | 3 | (220, 240, 175) | 30 |
| | COL_HAPPY_02 | 1 | (240, 250, 140) | 25 |
| | | 2 | (255, 255, 0) | 50 |
| | | 3 | (255, 230, 100) | 25 |
| ⋮ | ⋮ | ⋮ | ⋮ | ⋮ |

FIG. 6

| COLOR ARRANGEMENT MOOD | REPRESENTATIVE SIMILARITY DISTANCE |
|---|---|
| ADULT | 86600 |
| EXECUTIVE | 98700 |
| URBAN | 105000 |
| HEAVY | 123400 |
| ⋮ | ⋮ |

| COLOR ARRANGEMENT MOOD | CONTENT NAME | CONTENT MOOD |
|---|---|---|
| RELAX | Two By Two (Artist 1) | RELAXED |
| HAPPY | Watermelon (Artist 2) | HAPPY |
|  | Yellow Lightning (Artist 3) | HAPPY |
| COLD | Wonderful Midnight (Artist 4) | CALM |
| ADULT | Wonderful Midnight (Artist 4) | CALM |
| ⋮ | ⋮ | ⋮ |

| CONTENT MOOD | COLOR ARRANGEMENT MOOD |
|---|---|
| RELAXED | RELAX |
| HAPPY | HAPPY |
| CALM | COLD |
| | ADULT |
| ⋮ | ⋮ |

FIG. 17
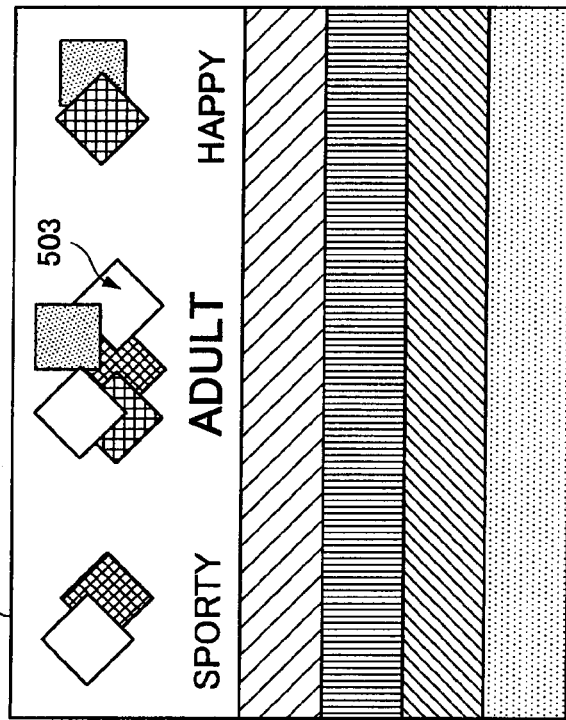
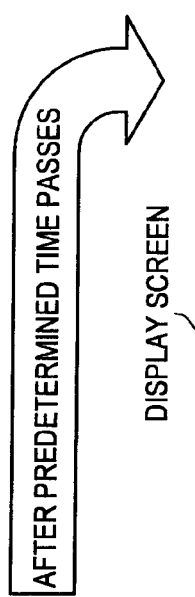
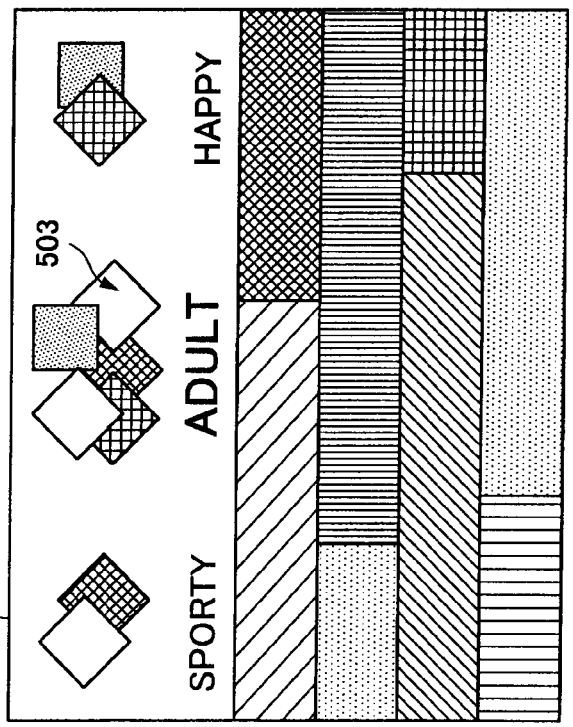

FIG. 24

| COLOR ARRANGEMENT MOOD | CUTE | | | ... |
|---|---|---|---|---|
| TEMPLATE ID | TEMP_CUTE_01 | TEMP_CUTE_02 | TEMP_CUTE_03 | ... |
| TEMPLATE DATA | | | | ... |

FIG. 25

| COLOR ARRANGEMENT MOOD | CONTENT NAME | TEMPLATE ID | COLOR ARRANGEMENT PATTERN ID | COLOR INDEX TO BE USED*) |
|---|---|---|---|---|
| RELAX | 01.jpg | TEMP_RELAX_04 | COL_RELAX_01 | 1, 2 |
|  | 03.jpg | TEMP_RELAX_02 | COL_RELAX_02 | 3, 2, 4 |
| HAPPY | 02.jpg | TEMP_HAPPY_01 | COL_HAPPY_02 | 1, 2 |
|  | 04.jpg | TEMP_HAPPY_02 | COL_HAPPY_02 | 2, 3 |
|  |  |  |  |  |

*) ORDER OF ASSOCIATING WITH TEMPLATE ID

INFORMATION PROCESSING APPARATUS, INFORMATION PROCESSING METHOD AND PROGRAM

BACKGROUND OF THE INVENTION

1. Field of the Invention

The present invention relates to an information processing apparatus, an information processing method, and a program.

2. Description of the Related Art

Generally when an atmosphere (mood) of colors of some image is analyzed from the image, a representative color extracted from within the image is commonly used as a characteristic quantity used for the mood analysis. For example, Japanese Patent Application Laid-Open No. 2004-185647 discloses a technique to decide the representative color arrangement from the level of attention of colors to perform a mood analysis of the image.

SUMMARY OF THE INVENTION

According to the technique described in Japanese Patent Application Laid-Open No. 2004-185647, a plurality of specific representative colors is selected to perform a mood analysis from a combination of these representative colors. However, according to the technique described in Japanese Patent Application Laid-Open No. 2004-185647, there is an issue that it is difficult to appropriately analyze an atmosphere of colors of an image because the number of representative colors used for mood analysis is limited.

In light of the foregoing, it is desirable to provide an information processing apparatus, an information processing method, and a program, which are novel and improved, and which are capable of analyzing an atmosphere of color arrangement information more appropriately based on the color arrangement information composed of a combination of colors.

According to an embodiment of the present invention, there is provided an information processing apparatus including a storage unit in which a color arrangement database recording correspondences between color arrangement information about a combination of colors and a color arrangement mood concerning an atmosphere provided by the combination of colors is stored; and a color arrangement mood analysis unit that analyzes the input color arrangement information based on the color arrangement database to determine the color arrangement mood corresponding to the combination of colors represented by the input color arrangement information.

The color arrangement mood analysis unit may calculate an index indicating a degree of similarity between the input color arrangement information and the color arrangement information stored in the color arrangement database, and the color arrangement mood associated with the color arrangement information closest to the input color arrangement information and stored in the color arrangement database may be set as the color arrangement mood corresponding to the combination of colors represented by the input color arrangement information.

The information processing apparatus may further include a histogram generation unit that generates, based on an input image, a histogram representing the combination of colors contained in the image, and the color arrangement mood analysis unit may use the histogram generated by the histogram generation unit as the input color arrangement information.

The information processing apparatus may further include an attention value calculation unit that calculates an attention value indicating the degree of the color contained in the input image to attract attention of a user; and a subtractive color processing unit that reduces a number of colors contained in the input image to a predetermined number of colors, and the histogram generation unit may generate the histogram by a convolution of the input image whose number of colors has been reduced by the subtractive color processing unit and the attention value calculated by the attention value calculation unit.

Predetermined content and atmosphere information indicating an atmosphere provided by the content to a user may be associated and stored in the storage unit, and the information processing apparatus may further include a color arrangement mood selection unit that selects one or a plurality of color arrangement moods corresponding to the input color arrangement information based on the index indicating the degree of the similarity calculated by the color arrangement mood analysis unit; and a content selection unit that selects the content stored in the storage unit based on the one or the plurality of color arrangement moods selected by the color arrangement mood selection unit.

A mood conversion database recording correspondences between the atmosphere information indicating the atmosphere provided by the content to the user and the color arrangement mood may be stored in the storage unit, and the content selection unit may select the content by using the mood conversion database.

According to another embodiment of the present invention, there is provided an information processing method, including the steps of analyzing input color arrangement information based on a color arrangement database recording correspondences between the color arrangement information about a combination of colors and a color arrangement mood concerning an atmosphere provided by the combination of colors; and determining the color arrangement mood corresponding to the combination of colors represented by the input color arrangement information.

According to still another embodiment of the present invention, there is provided a program causing a computer to realize a color arrangement mood analysis function that analyzes input color arrangement information based on a color arrangement database recording correspondences between the color arrangement information about a combination of colors and a color arrangement mood concerning an atmosphere provided by the combination of colors to determine the color arrangement mood corresponding to the combination of colors represented by the input color arrangement information.

According to the embodiments of the present invention described above, an atmosphere of color arrangement information can be analyzed more appropriately based on the color arrangement information composed of a combination of colors.

BRIEF DESCRIPTION OF THE DRAWINGS

FIG. 5 is an explanatory view exemplifying a color arrangement mood database;

FIG. 6 is an explanatory view exemplifying a calculated representative similarity distance;

FIG. 17 is an explanatory view exemplifying the display screen of the information processing apparatus according to the embodiment;

FIG. 24 is an explanatory view exemplifying a template database according to the embodiment;

FIG. 25 is an explanatory view exemplifying the content database according to the embodiment;

DETAILED DESCRIPTION OF THE EMBODIMENTS

Figure 1:
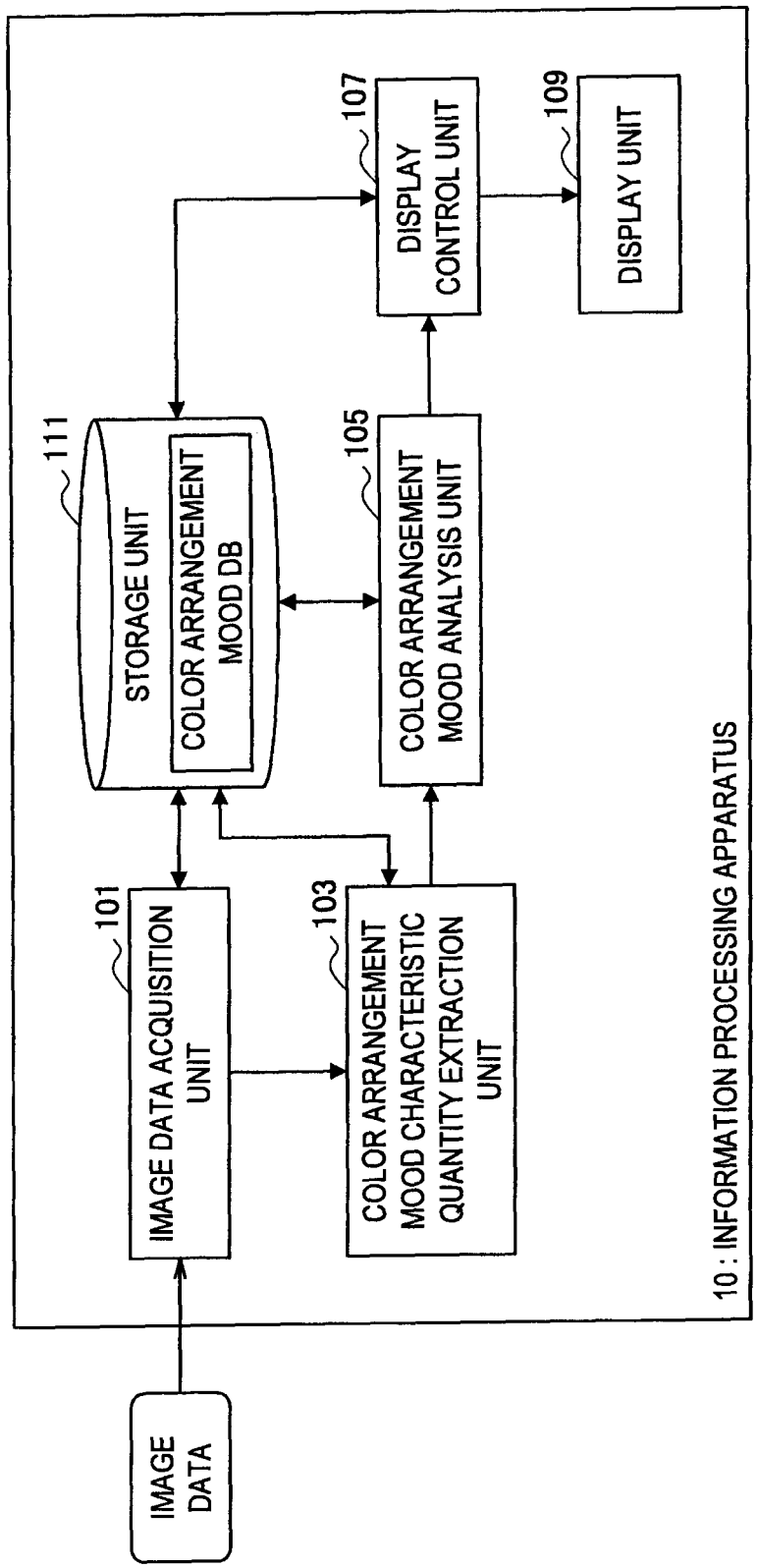
FIG. 1 is a block diagram showing a configuration of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

(1) First embodiment
(1-1) Configuration of the information processing apparatus
(1-2) Information processing method
(2) Second embodiment
(2-1) Configuration of the information processing apparatus
(2-2) Display screen example
(2-3) Information processing method
(3) Third embodiment
(3-1) Configuration of the information processing apparatus
(3-2) Display screen example
(3-3) Information processing method
(4) Fourth embodiment
(4-1) Configuration of the information processing apparatus
(5) Hardware configuration of the information processing apparatus according to an embodiment of the present invention
(6) Summary

First Embodiment

First, an information processing apparatus and an information processing method according to the first embodiment of the present invention will be described with reference to FIGS. 1 to 9.

<Configuration of the Information Processing Apparatus>

First, the configuration of an information processing apparatus according to the present embodiment will be described in detail with reference to FIGS. 1 to 6.

FIG. 1 is a block diagram showing the configuration of an information processing apparatus according to the present embodiment. As shown in FIG. 1, an information processing apparatus 10 according to the present embodiment mainly includes an image data acquisition unit 101, a color arrangement mood characteristic quantity extraction unit 103, a color arrangement mood analysis unit 105, a display control unit 107, a display unit 109, and a storage unit 111.

The image data acquisition unit 101 is realized by, for example, a CPU (Central Processing Unit), ROM (Read Only Memory), RAM (Random Access Memory), input apparatus, communication apparatus and the like. The image data acquisition unit 101 acquires image data corresponding to an image specified by the user of the information processing apparatus 10.

The image data acquisition unit 101 may acquire image data specified by the user from the storage unit 111 described later or a removable recording medium inserted into or connected to various drives included in the information processing apparatus 10. Also, the image data acquisition unit 101 may acquire image data specified by the user from an externally connected device connected to a connection port included in the information processing apparatus 10. Also, the image data acquisition unit 101 can acquire image data input via an input apparatus such as a scanner or via various networks such as a home network and the Internet.

The image data acquisition unit 101 outputs the acquired image data (hereinafter, referred to also as an input image) to the color arrangement mood characteristic quantity extraction unit 103 described later. The image data acquisition unit 101 may also associate the acquired image data with information indicating the acquisition date/time of the image data and then store the image data in the storage unit 111 described later.

The color arrangement mood characteristic quantity extraction unit 103 is realized by, for example, a CPU, ROM, RAM and the like. The color arrangement mood characteristic quantity extraction unit 103 extracts a color arrangement mood characteristic quantity used for color arrangement mood analysis processing by the color arrangement mood analysis unit 105 described later from the input image.

Figure 2:
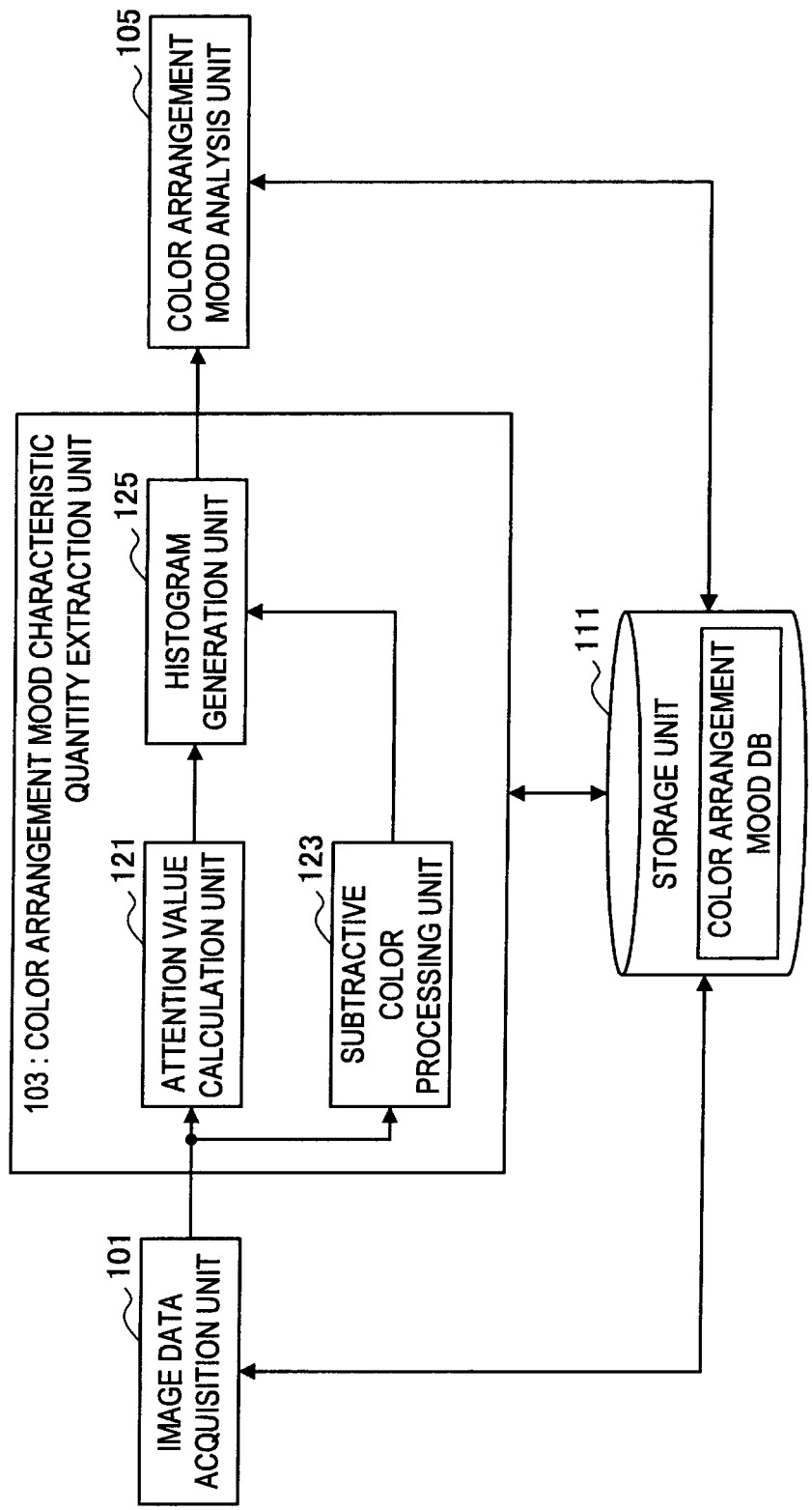
FIG. 2 is a block diagram showing the configuration of a color arrangement mood characteristic quantity extraction unit according to the embodiment.

The color arrangement mood characteristic quantity extraction unit 103 further includes, for example, as shown in FIG. 2, an attention value calculation unit 121, a subtractive color processing unit 123, and a histogram generation unit 125.

The attention value calculation unit 121 is realized by, for example, a CPU, ROM, RAM and the like. The attention value calculation unit 121 calculates an attention value indicating the degree of attracting people's attention by colors contained in an input image using the input image output from the image data acquisition unit 101.

The attention value calculation unit 121 can calculate the attention value of an input image by using methods shown below:

(a) Method of dividing the luminance (or the saturation or hue) of each pixel of an input image by the average value of the luminance (or the saturation or hue) of the whole input image (b) Method of extracting an area of an object moving between frames in a plurality of temporally continuous frames and using the extracted area of the moving object and the other area by binarizing these areas (c) Method of dividing the pixel value of each pixel by the average value of a distance value of a whole image in which the distance value to an object obtained by a stereo vision (multi-viewpoint) is set as a pixel (d) Method of using an attention area obtained by using a technology to select an area more likely to visually attract attention from an image based on the mechanism of human recognition as disclosed, for example, in Japanese Patent Application Laid-Open No. 2008-53775

(e) Method of binarizing and using pixel values in accordance with a specific object area obtained by using object recognition technology such as the face recognition technology and personal recognition technology (f) Method of binarizing and using pixel values based on areas that extract only portions in which the depth of field matches.

The attention value calculation unit 121 can use any other method than the above ones as the method of calculating an attention value.

By calculating the attention value by using a method as described above, the attention value calculation unit 121 can generate an image showing the degree of distribution of the attention value (hereinafter, referred to also as an attention value map) of an input image. The attention value map is an image obtained by assigning the attention value calculated as the pixel value to each pixel of the input image.

The attention value calculation unit 121 outputs attention value information about the attention value containing the above attention value map to the histogram generation unit 125. The attention value calculation unit 121 may also store the attention value information including the calculated attention value map in the storage unit 111 described later. When calculating the attention value of an input image, the attention value calculation unit 121 can use various programs or databases stored in the storage unit 111 or the like.

The subtractive color processing unit 123 is realized by, for example, a CPU, ROM, RAM and the like. The subtractive color processing unit 123 performs processing (subtractive color processing) to reduce the number of colors on an input image output from the image data acquisition unit 101. The input image is converted into an image composed of a predetermined number of colors by subtractive color processing performed by the subtractive color processing unit 123.

Any method capable of calculating the ratio of areas occupied by colors in an image can be used as the subtractive color processing method executed by the subtractive color processing unit 123. An example of the subtractive color processing method executed by the subtractive color processing unit 123 is the color quantization method using an octree.

After the subtractive color processing being performed on the input image, the subtractive color processing unit 123 outputs the obtained image whose number of colors has been reduced to the histogram generation unit 125 described later. The subtractive color processing unit 123 may also store the image whose number of colors has been reduced in the storage unit 111 described later. When performing the subtractive color processing on the input image, the subtractive color processing unit 123 can use various programs or databases stored in the storage unit 111 or the like.

The histogram generation unit 125 is realized by, for example, a CPU, ROM, RAM and the like. The histogram generation unit 125 generates a histogram (color histogram) showing which color is contained in what ratio by using attention value information including the attention value map calculated by the attention value calculation unit 121 and the input image generated by the subtractive color processing unit 123 and whose number of colors has been reduced. That is, the color histogram generated by the histogram generation unit 125 is information (color arrangement information) showing combinations of colors contained in the input image and is also a characteristic quantity (color arrangement mood characteristic quantity) characterizing an atmosphere (color arrangement mood) provided by colors contained in the input image to a person.

The method of generating a color histogram used by the histogram generation unit 125 is not specifically limited and, for example, one of methods shown below can be used:

(a) Convolve an attention value map into each pixel of an input image whose number of colors has been reduced.

(b) Binarize an attention value map by performing threshold processing on the attention value map and convolve the binarized attention value map into each pixel of an input image whose number of colors has been reduced.

(c) Binarize an attention value map by performing threshold processing on the attention value map to generate a binary image. Further, generate a new image in which the minimum rectangular area enclosing a pixel whose pixel value is 1 in the binary image takes 1 and other areas take 0. Convolve the newly generated image into each pixel of an input image whose number of colors has been reduced.

The histogram generation unit 125 outputs information about the generated color histogram to the color arrangement mood analysis unit 105. The histogram generation unit 125 may also store the information about the generated color histogram in the storage unit 111 described later. When generating a color histogram, the histogram generation unit 125 can use various programs or databases stored in the storage unit 111 or the like.

Figure 3:
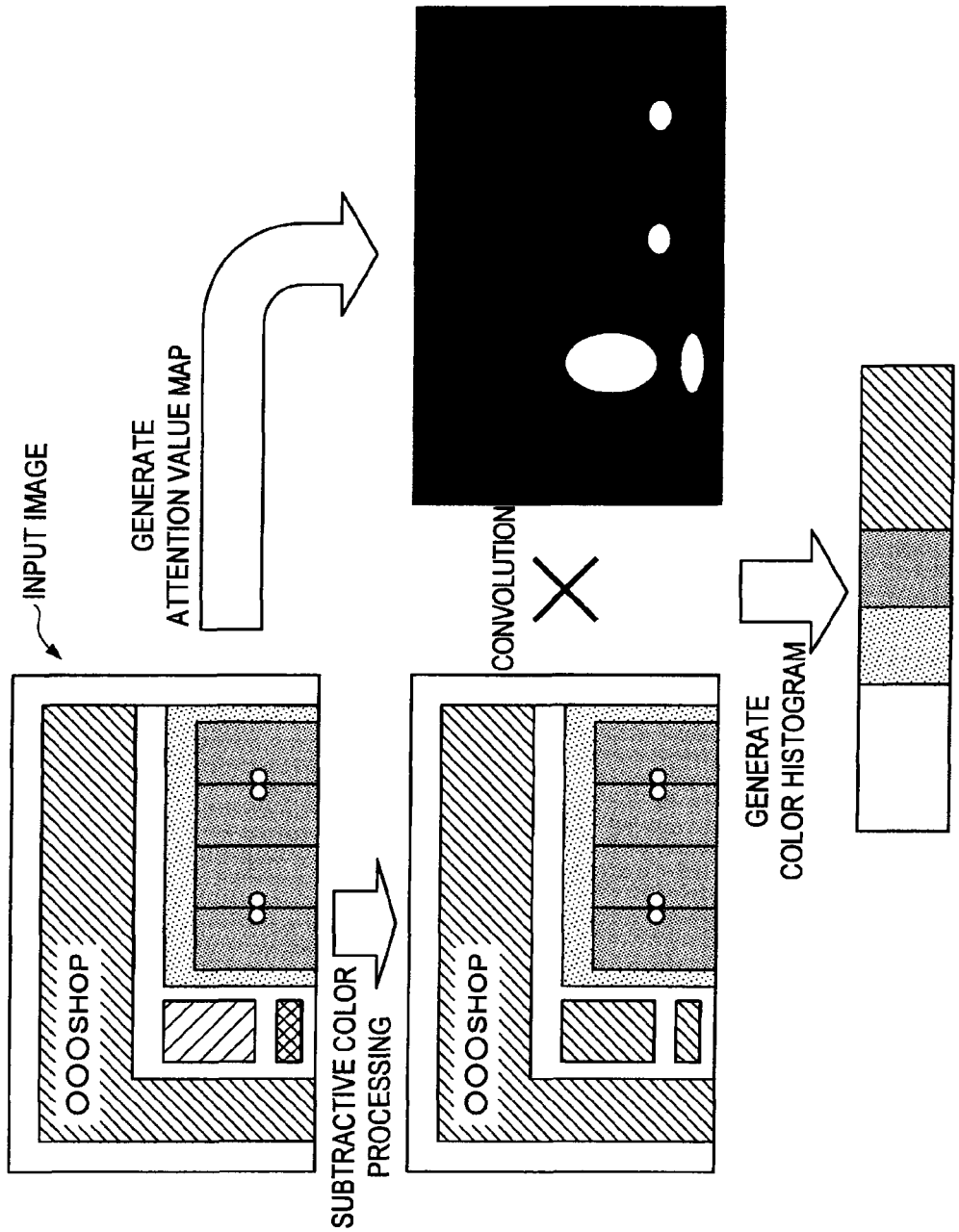
FIG. 3 is an explanatory view exemplifying an extraction method of a color arrangement mood characteristic quantity.

FIG. 3 is an explanatory view schematically showing processing performed by the color arrangement mood characteristic quantity extraction unit 103 according to the present embodiment. As shown in FIG. 3, when an input image is transmitted to the color arrangement mood characteristic quantity extraction unit 103, the attention value calculation unit 121 generates attention value information including the attention value map of the input image and the subtractive color processing unit 123 performs subtractive color processing on the input image. Then, the histogram generation unit 125 generates a color histogram by carrying out a convolution of the input image whose number of colors has been reduced and the attention value map. The color histogram generated in this manner takes the degree of attention of people to colors in the image into consideration because the attention value map is used in the generation process thereof.

FIG. 2 illustrates a case when the color arrangement mood characteristic quantity extraction unit 103 according to the present embodiment includes the subtractive color processing unit 123. However, if there is no need to worry about the processing time or operation costs or a more correct color histogram should be generated, the color arrangement mood characteristic quantity extraction unit 103 does not have to perform subtractive color processing by the subtractive color processing unit 123 and may not include the subtractive color processing unit 123.

In the foregoing, the color arrangement mood characteristic quantity extraction unit 103 according to the present embodiment has been described in detail with reference to FIGS. 2 and 3. Returning to FIG. 1 again, the configuration of the information processing apparatus 10 according to the present embodiment will be described below.

The color arrangement mood analysis unit 105 is realized by, for example, a CPU, ROM, RAM and the like. The color arrangement mood analysis unit 105 analyzes information about a color histogram (that is, color arrangement information) output from the color arrangement mood characteristic quantity extraction unit 103 to determine a color arrangement mood corresponding to the combination of colors represented by the input color histogram.

Figure 4:
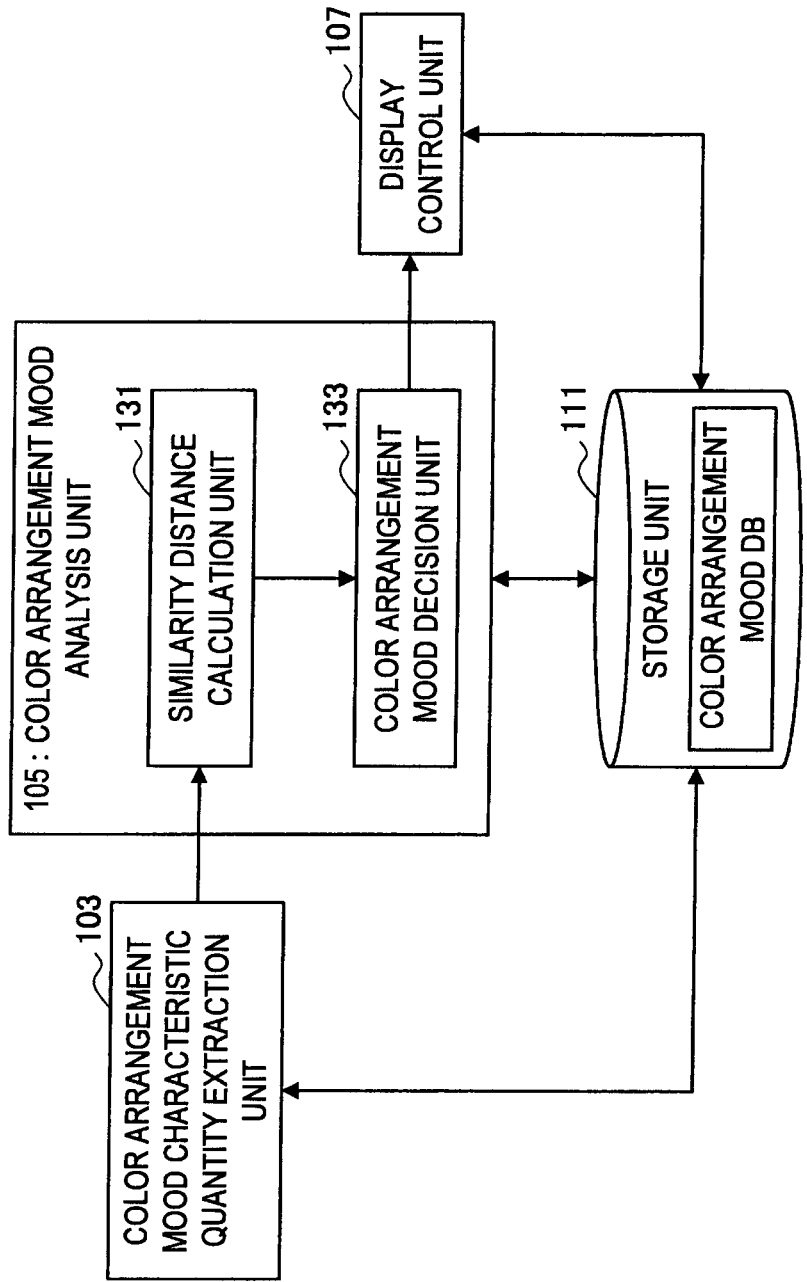
FIG. 4 is a block diagram showing the configuration of a color arrangement mood analysis unit according to the embodiment.

The color arrangement mood analysis unit 105 will be described in detail below with reference to FIG. 4. FIG. 4 is a block diagram showing the configuration of the color arrangement mood analysis unit 105 according to the present embodiment.

As shown in FIG. 4, the color arrangement mood analysis unit 105 according to the present embodiment further includes a similarity distance calculation unit 131 and a color arrangement mood decision unit 133.

The similarity distance calculation unit 131 is realized by, for example, a CPU, ROM, RAM and the like. The similarity distance calculation unit 131 calculates a similarity distance between a color histogram (color arrangement information) output from the color arrangement mood characteristic quantity extraction unit 103 and color arrangement information registered with a color arrangement mood database (hereinafter, abbreviated as a color arrangement mood DB) by using the color arrangement mood DB stored in the storage unit 111. In the description below, for convenience's sake, color arrangement information output from the color arrangement mood characteristic quantity extraction unit 103 is called input color arrangement information and color arrangement information registered with the color arrangement mood DB is called registered color arrangement information.

Before describing calculation processing of a similarity distance performed by the similarity distance calculation unit 131, the color arrangement mood DB stored in the storage unit 111 will be described with reference to FIG. 5. FIG. 5 is an explanatory view exemplifying the color arrangement mood DB.

The color arrangement mood DB is a database recording correspondences between color arrangement information about color combinations and color arrangement moods concerning an atmosphere provided to a person by the color combination. In FIG. 5, for example, "RELAX" and "HAPPY" are shown as the color arrangement mood (that is, an atmosphere provided to a person by some color combination). The color arrangement mood "RELAX" means a color combination that provides an atmosphere of relaxation to a person who views the color combination belonging to this color arrangement mood. Similarly, the color arrangement mood "HAPPY" means a color combination that provides an atmosphere of happiness to a person who views the color combination belonging to this color arrangement mood.

In the example shown in FIG. 5, two color arrangement patterns (that is, color combinations) are associated with the color arrangement mood "RELAX". The color combination (that is, color arrangement information) to which the color arrangement pattern ID "COL_RELAX_01" is attached means a combination of a color (color to which the color INDEX=1 is attached) represented by RGB values (240, 250, 215) and a color (color to which the color INDEX=2 is attached) represented by RGB values (215, 240, 107) in an area ratio of 50:50. Similarly, the color combination (color arrangement information) to which the color arrangement pattern ID "COL_RELAX_02" is attached means a combination of four colors to which color INDEXES=1 to 4 are attached in an area ratio of 20:20:40:20. Thus, in the color arrangement mood DB, one color arrangement mood is associated with one or a plurality of color combinations (color arrangement information) belonging to the color arrangement mood.

Each piece of color arrangement information is constituted of a plurality of colors in the example shown in FIG. 5, but the color arrangement information may be constituted of one color.

The color arrangement mood registered with the color arrangement mood DB is not limited to the example shown in FIG. 5 and atmospheres related to any abstract notion provided to a person by color combinations such as human emotions, comfort/discomfort, senses of cold/warmth, and senses of heaviness/lightness may also be registered. In addition to the example shown in FIG. 5, examples of the color arrangement mood include, for example, COLD, WARM, HEAVY, LIGHT, SPORTY, CUTE, ADULT, CHILDISH, URBAN, and EXECUTIVE.

Using such a color arrangement mood DB, the similarity distance calculation unit 131 calculates the similarity distance, which is an example of index indicating the degree of similarity between input color arrangement information and registered color arrangement information and the calculated similarity distance decreases with an increasing similarity between the input color arrangement information and registered color arrangement information.

The method of calculating the similarity distance used by the similarity distance calculation unit 131 is not specifically limited as long as the method can calculate a similarity distance between color arrangement information even if the number of colors or areas occupied by colors are different. As such a similarity distance, for example, the similarity distance calculation unit 131 can use "Earth Mover's Distance" (EMD) disclosed in, for example, WO 2007/114939. While details thereof are described in WO 2007/114939, the EMD is a similarity distance calculated by focusing on dimensions of an area occupied in a predetermined space (for example, the L*a*b space or the RGB space) by a color contained in some image and is a similarity distance calculated by using a distance (for example, a Euclidean distance or Hausdorff distance) $d_{pq}$ between some color p and some color q and a quantity $e_{pq}$ indicating how far an area occupied by the color p can be moved to an area occupied by the color q.

After input color arrangement information being acquired, the similarity distance calculation unit 131 focuses on one color arrangement mood (for example, RELAX shown in FIG. 5) registered with the color arrangement mood DB to calculate a similarity distance between the input color arrangement information and all registered color arrangement information belonging to the focused color arrangement mood. That is, if RELAX shown in FIG. 5 is focused on, the similarity distance calculation unit 131 calculates a similarity distance between the input color arrangement information and the registered color arrangement information represented by "COL_RELAX_01" and a similarity distance between the input color arrangement information and the registered color arrangement information represented by "COL_RELAX_02". After similarity distances between all registered color arrangement information belonging to the focused color arrangement mood and the input color arrangement information being calculated, the similarity distance calculation unit 131 identifies the shortest similarity distance among calculated similarity distances. The similarity distance calculation unit 131 determines the identified shortest similarity distance as a representative similarity distance between the input color arrangement information and the focused color arrangement mood.

The similarity distance calculation unit 131 calculates the above representative similarity distance for all color arrangement moods registered with the color arrangement mood DB. By performing such processing, for example, as shown in FIG. 6, the similarity distance calculation unit 131 can calculate representative similarity distances for all color arrangement moods. These representative similarity distances are quantification (digitization) of various atmospheres (color arrangement moods) contained in the input color arrangement information (by extension, the input image).

When calculations of representative similarity distances for all color arrangement moods are completed, the similarity distance calculation unit 131 outputs the calculated representative similarity distances to the color arrangement mood decision unit 133 described later. At this point, the similarity distance calculation unit 131 may individually output all calculated representative similarity distances to the color arrangement mood decision unit 133 or output the calculated representative similarity distances to the color arrangement mood decision unit 133 in a lookup table format as shown in FIG. 6. The similarity distance calculation unit 131 may store calculated representative similarity distances and similarity distances to registered color arrangement information belonging to each color arrangement mood in the storage unit 111 by associating with input color arrangement information. By storing correspondences between input color arrangement information and calculated similarity distances/representative similarity distances in the storage unit 111 or the like, time and efforts when representative similarity distances are calculated for the same input color arrangement information next time can be saved. When calculating a similarity distance between input color arrangement information and registered color arrangement information, the similarity distance calculation unit 131 can use various programs and other databases stored in the storage unit 111 or the like.

The color arrangement mood decision unit 133 is realized by, for example, a CPU, ROM, RAM and the like. The color arrangement mood decision unit 133 decides the atmosphere (color arrangement mood) provided to people by the color combination represented by the input color arrangement information based on the representative similarity distance output from the similarity distance calculation unit 131.

As described above, the value of similarity distance calculated by the similarity distance calculation unit 131 and containing the representative similarity distance decreases with an increasing similarity between input color arrangement information and registered color arrangement information. Therefore, with a decreasing value of the representative similarity distance associated with each color arrangement mood, the likelihood of the color arrangement mood of input color arrangement information increases.

Thus, the color arrangement mood decision unit 133 decides the color arrangement mood with the minimum representative similarity distance as the color arrangement mood corresponding to the input color arrangement information by referring to representative similarity distances output from the similarity distance calculation unit 131.

In the case of the representative similarity distances shown in FIG. 6, the representative similarity distance of the color arrangement mood "ADULT" is the smallest distance of 86600 and thus, the color arrangement mood decision unit 133 decides that the color arrangement mood of the input color arrangement information used for calculating the representative similarity distances shown in FIG. 6 is "ADULT".

Instead of deciding one color arrangement mood as the color arrangement mood corresponding to the input color arrangement information, the color arrangement mood decision unit 133 may decide a plurality of color arrangement moods as the color arrangement mood corresponding to the input color arrangement information. For example, the color arrangement mood decision unit 133 may arrange color arrangement moods in ascending order of value of the representative similarity distance to decide a predetermined number of smallest color arrangement moods (for example, three color arrangement moods in ascending order of value) as the color arrangement mood corresponding to the input color arrangement information.

The color arrangement mood decision unit 133 outputs the color arrangement mood decided in this manner and corresponding to the input color arrangement information (by extension, the input image) to the display control unit 107. The color arrangement mood decision unit 133 may also store information about the decided color arrangement mood in the storage unit 111 or the like by associating with time information and the like.

In the foregoing, the color arrangement mood analysis unit 105 according to the present embodiment has been described in detail with reference to FIGS. 4 to 6. Returning to FIG. 1 again, the configuration of an information processing apparatus according to the present embodiment will be described below.

The display control unit 107 is realized by, for example, a CPU, ROM, RAM and the like. The display control unit 107 is a processing unit that exercises display control of content of the display screen displayed in the display unit 109 included in the information processing apparatus 10. More specifically, the display control unit 107 exercises display control to display analysis results about the color arrangement mood output from the color arrangement mood analysis unit 105 in the display unit 109. At this point, the display control unit 107 displays analysis results about the color arrangement mood output from the color arrangement mood analysis unit 105 in the display unit 109 by using various graphical user interfaces (GUI). Therefore, the display control unit 107 also exercises display control of various GUIs displayed in the display screen of the display unit 109. Such GUIs may be stored in, for example, the storage unit 111 or may be acquired by the information processing apparatus 10 via various networks such as the Internet.

When displaying analysis results about the color arrangement mood output from the color arrangement mood analysis unit 105, the display control unit 107 can use various programs and other databases stored in the storage unit 111 or the like.

The display unit 109 is an example of an output apparatus included in the information processing apparatus 10 according to the present embodiment and may be, for example, various kinds of displays included in the information processing apparatus 10. The display unit 109 is controlled by the display control unit 107 and displays various kinds of information such as the color arrangement mood corresponding to an input image in the display screen thereof. The user of the information processing apparatus 10 can understand the color arrangement mood corresponding to an image (input image) input into the information processing apparatus 10 by referring to content displayed in the display screen of the display unit 109.

The storage unit 111 is an example of a storage apparatus included in the information processing apparatus 10 according to the present embodiment. In the storage unit 111, the color arrangement mood DB used when the color arrangement mood analysis unit 105 analyzes input color arrangement information is stored. Various kinds of image data intended for color arrangement mood analysis may also be stored in the storage unit 111.

In the storage unit 111, various kinds of history information such as history information about extraction of color arrangement mood characteristic quantities and history information about analysis results of color arrangement mood may be recorded. Further, various parameters necessary to store when the information processing apparatus 10 according to the present embodiment performs some kind of processing, the progress of processing, and various databases are recorded in the storage unit 111 when appropriate.

Each processing unit included in the information processing apparatus 10 such as the image data acquisition unit 101, the color arrangement mood characteristic quantity extraction unit 103, the color arrangement mood analysis unit 105, and the display control unit 107 can freely read/write information from/to the storage unit 111.

As described above, the information processing apparatus 10 according to the present embodiment uses colors contained in an input image and the ratio of these colors in the image to generate a color histogram used for performing the color arrangement mood analysis of the image. Thus, the information processing apparatus 10 according to the present embodiment can evaluate features of colors in the whole image more accurately than in the past. Also in the present embodiment, attention value information including the attention value map is used when generating a color histogram and thus, characteristic quantities of the mood analysis closer to the impression of human eyes are generated. Thus, a color histogram in which a color with an increasing level of attention has an increasing area can be generated so that an input image can be analyzed more accurately.

The information processing apparatus 10 according to the present embodiment may be realized as a computer such as a personal computer and various servers or as a mobile electronic device such as a mobile music player, mobile game machine, mobile phone, smart phone, and PDA. Or, the information processing apparatus 10 according to the present embodiment may be realized as a digital video camera, digital still camera, or car navigation system.

In the foregoing, an example of the function of the information processing apparatus 10 according to the present embodiment has been shown. Each of the above structural elements may be configured by using common members or circuits or hardware specialized to the function of each structural element. Or, the function of each structural element may all be executed by a CPU or the like. Therefore, elements to be used can be changed when appropriate in accordance with the technical level when the present invention is carried out.

A computer program to realize each function of an information processing apparatus according to the present embodiment described above may be created and implemented on a personal computer or the like. Or, a computer readable recording medium in which such a computer program is stored may be provided. The recording medium is, for example, a magnetic disk, optical disk, magneto-optical disk, or flash memory. The above computer program may be delivered via, for example, a network without using any recording medium.

<Information Processing Method>

Figure 7:
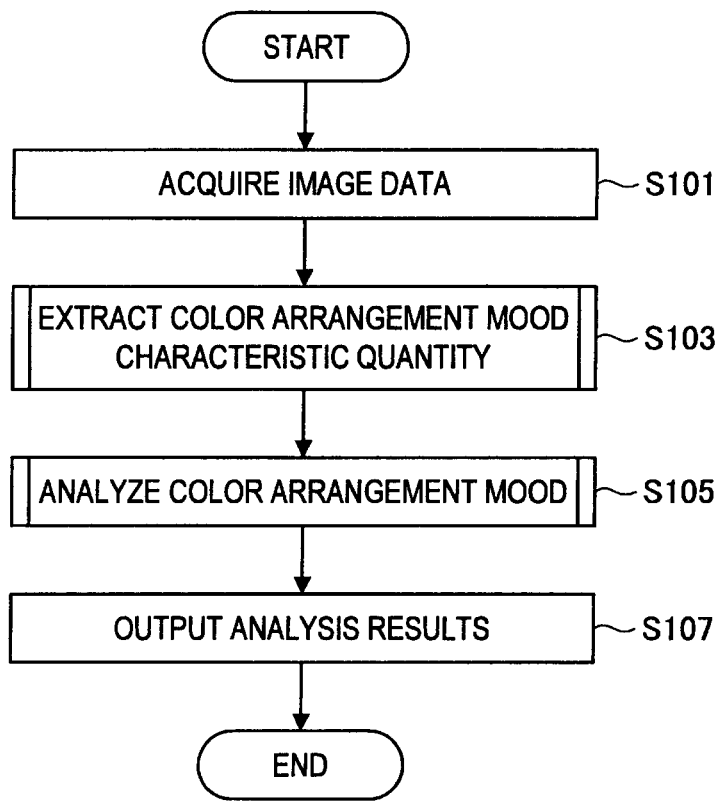
FIG. 7 is a flow chart showing the flow of an information processing method according to the embodiment.
Figure 8:
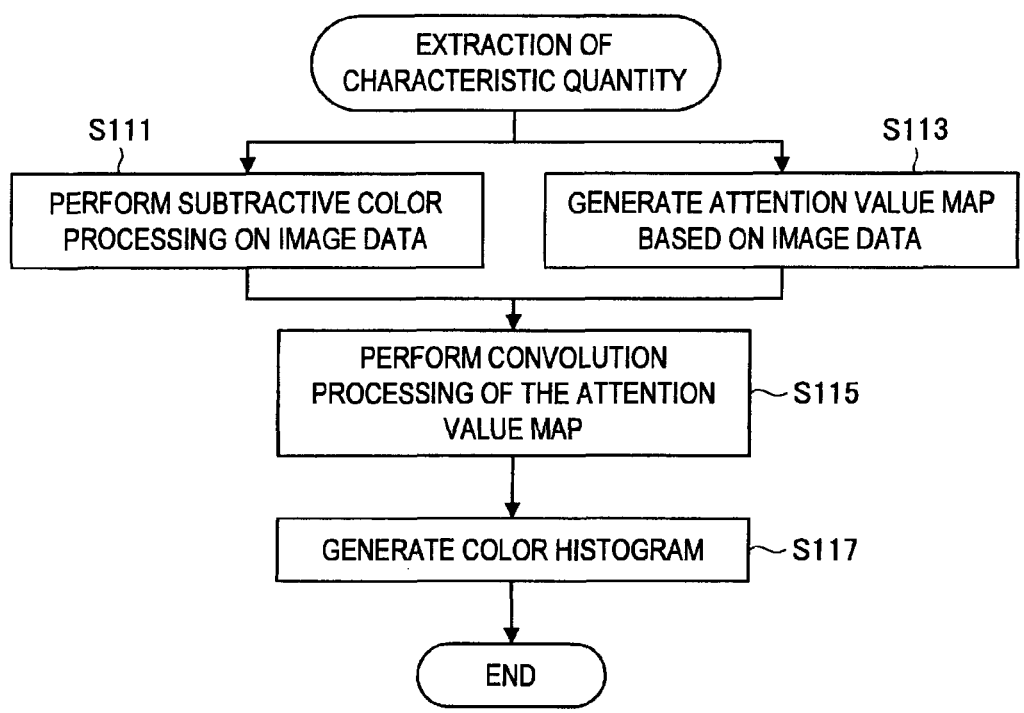
FIG. 8 is a flow chart showing the flow of a characteristic quantity extraction method according to the embodiment.
Figure 9:
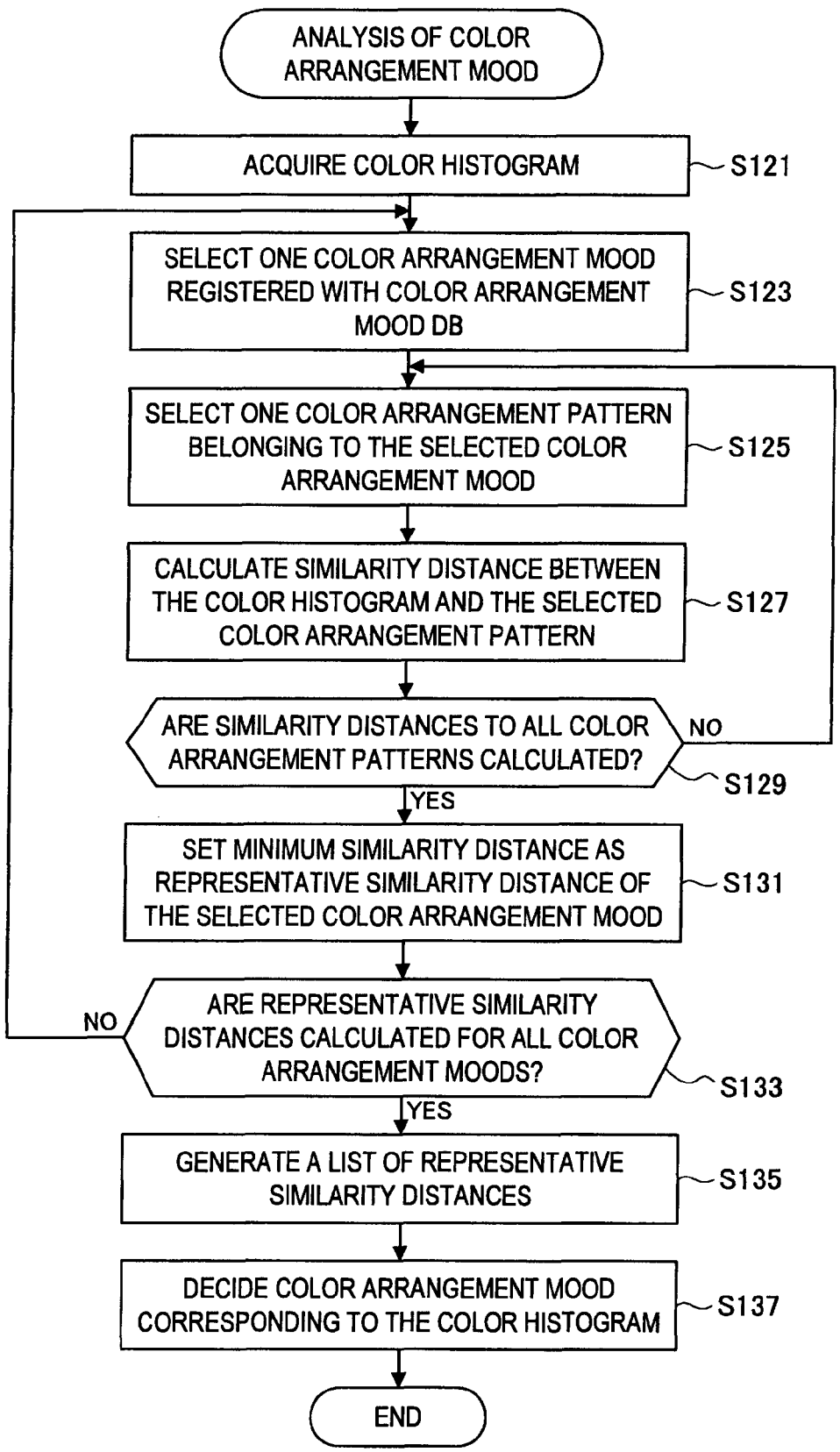
FIG. 9 is a flow chart showing the flow of an analysis method of a color arrangement mood according to the embodiment.

Subsequently, the flow of the information processing method executed by the information processing apparatus 10 according to the present embodiment will be described with reference to FIGS. 7 to 9.

[Overall Flow]

First, the overall flow of the information processing method according to the present embodiment will be described with reference to FIG. 7. FIG. 7 is a flow chart showing the flow of the information processing method according to the present embodiment.

First, the image data acquisition unit 101 of the information processing apparatus 10 acquires image data corresponding to an image whose color arrangement mood should be analyzed (step S101). The image data acquisition unit 101 outputs the acquired image data to the color arrangement mood characteristic quantity extraction unit 103.

The color arrangement mood characteristic quantity extraction unit 103 extracts a color arrangement mood characteristic quantity, which is a characteristic quantity used when the analysis of color arrangement mood is performed, by using the image data output from the image data acquisition unit 101 (step S103). As the color arrangement mood characteristic quantity extracted at this point, a histogram about colors contained in the image corresponding to the image data acquired by the image data acquisition unit 101 can be cited. The color arrangement mood characteristic quantity extraction unit 103 outputs the extracted color arrangement mood characteristic quantity to the color arrangement mood analysis unit 105.

The color arrangement mood analysis unit 105 performs an analysis of the color arrangement mood corresponding to the image by using the color arrangement mood characteristic quantity (color histogram) output from the color arrangement mood characteristic quantity extraction unit 103 and the color arrangement mood DB stored in the storage unit 111 (step S105). When the analysis about the color arrangement mood corresponding to the image is finished, the color arrangement mood analysis unit 105 outputs the obtained analysis results to the display control unit 107 (step S107).

The display control unit 107 displays analysis results output from the color arrangement mood analysis unit 105 in the display screen of the display unit 109 while using various GUIs. Accordingly, the user can know analysis results of the color arrangement mood corresponding to some image.

[Extraction Processing of the Characteristic Quantity]

Next, the flow of extraction processing of the color arrangement mood characteristic quantity performed by the color arrangement mood characteristic quantity extraction unit 103 will be described with reference to FIG. 8. FIG. 8 is a flow chart showing the flow of the characteristic quantity extraction method according to the present embodiment.

When image data is output from the image data acquisition unit 101, the color arrangement mood characteristic quantity extraction unit 103 transmits the acquired image data to the attention value calculation unit 121 and the subtractive color processing unit 123.

The subtractive color processing unit 123 performs subtractive color processing on the transmitted image data (step S111) to reduce the number of colors contained in the transmitted image data. Then, the subtractive color processing unit 123 outputs the obtained image data whose number of colors has been reduced to the histogram generation unit 125.

The attention value calculation unit 121, on the other hand, generates an attention value map by using the above-described method of the transmitted image data (step S113) and outputs attention value information including the obtained attention value map to the histogram generation unit 125.

The histogram generation unit 125 performs processing to convolve the attention value map output from the attention value calculation unit 121 into the image whose number of colors has been reduced output from the subtractive color processing unit 123 (step S115). Then, the histogram generation unit 125 generates a color histogram showing which color is contained in the image in what ratio by using the image data obtained by the convolution processing (step S117). Then, the histogram generation unit 125 outputs the generated color histogram to the color arrangement mood analysis unit 105.

[Analysis Processing of the Color Arrangement Mood]

Next, the flow of analysis processing of the color arrangement mood performed by the color arrangement mood analysis unit 105 will be described with reference to FIG. 9. FIG. 9 is a flow chart showing the flow of the analysis method of the color arrangement mood according to the present embodiment.

First, the similarity distance calculation unit 131 of the color arrangement mood analysis unit 105 acquires the color histogram (that is, input color arrangement information) output from the histogram generation unit 125 (step S121). Then, the similarity distance calculation unit 131 refers to the color arrangement mood DB stored in the storage unit 111 to select one color arrangement mood registered with the database (step S123).

Subsequently, the similarity distance calculation unit 131 selects one color arrangement pattern (that is, registered color arrangement information) belonging to the color arrangement mood selected in step S123 (step S125). Then, the similarity distance calculation unit 131 calculates a similarity distance between the color histogram and the selected color arrangement pattern (similarity distance between input color arrangement information and registered color arrangement information) (step S127).

Next, the similarity distance calculation unit 131 determines whether similarity distances from the input color arrangement information to all color arrangement patterns belonging to the selected color arrangement mood have been calculated (step S129). If similarity distances to all color arrangement patterns have not yet been calculated, the similarity distance calculation unit 131 returns to step S125 to calculate similarity distances to color arrangement patterns that are not yet calculated. If similarity distances to all color arrangement patterns have been calculated, the similarity distance calculation unit 131 sets the minimum value of calculated similarity distances as the representative similarity distance of the selected color arrangement mood (step S131).

Then, the similarity distance calculation unit 131 determines whether representative similarity distances have been calculated for all color arrangement moods registered with the color arrangement pattern DB (step S133). If representative similarity distances have not yet been calculated for all color arrangement moods, the similarity distance calculation unit 131 returns to step S123 to repeat the processing for color arrangement moods for which the representative similarity distance is not yet calculated. If representative similarity distances have been calculated for all color arrangement moods, the similarity distance calculation unit 131 creates a list of representative similarity distances as illustrated in FIG. 6 (step S135) and outputs the generated list to the color arrangement mood decision unit 133.

The color arrangement mood decision unit 133 decides the color arrangement mood corresponding to the input color arrangement information (by extension, the input image) by using the list of representative similarity distances output from the similarity distance calculation unit 131 (step S137). After deciding the color arrangement mood corresponding to the input color arrangement information, the color arrangement mood decision unit 133 outputs the obtained result to the display control unit 107.

In the foregoing, an example of the flow of the information processing method executed in the information processing apparatus 10 according to the present embodiment has been described with reference to FIGS. 7 to 9.

Second Embodiment

The information processing apparatus 10 according to the first embodiment described above is an apparatus having a function to analyze an input image and to decide an atmosphere (color arrangement mood) provided to people by the color combination contained in the input image. The information processing apparatus 10 according to the second embodiment described below is an apparatus that uses the function to decide the color arrangement mood described in the first embodiment and further realizes a function to search for content by using an abstract matter of color arrangement mood.

When searching for various kinds of content, the search is generally performed by using a standardized tag (for example, the artist name or album name for a music file). However, if the user makes an ambiguous request such as a search for content fitting an atmosphere during the search, such a tag-based search method is not suitable. However, according to an information processing apparatus as described below, a function to search for content by using an abstract matter of color arrangement mood can be realized.

<Configuration of the Information Processing Apparatus>

Figure 10:
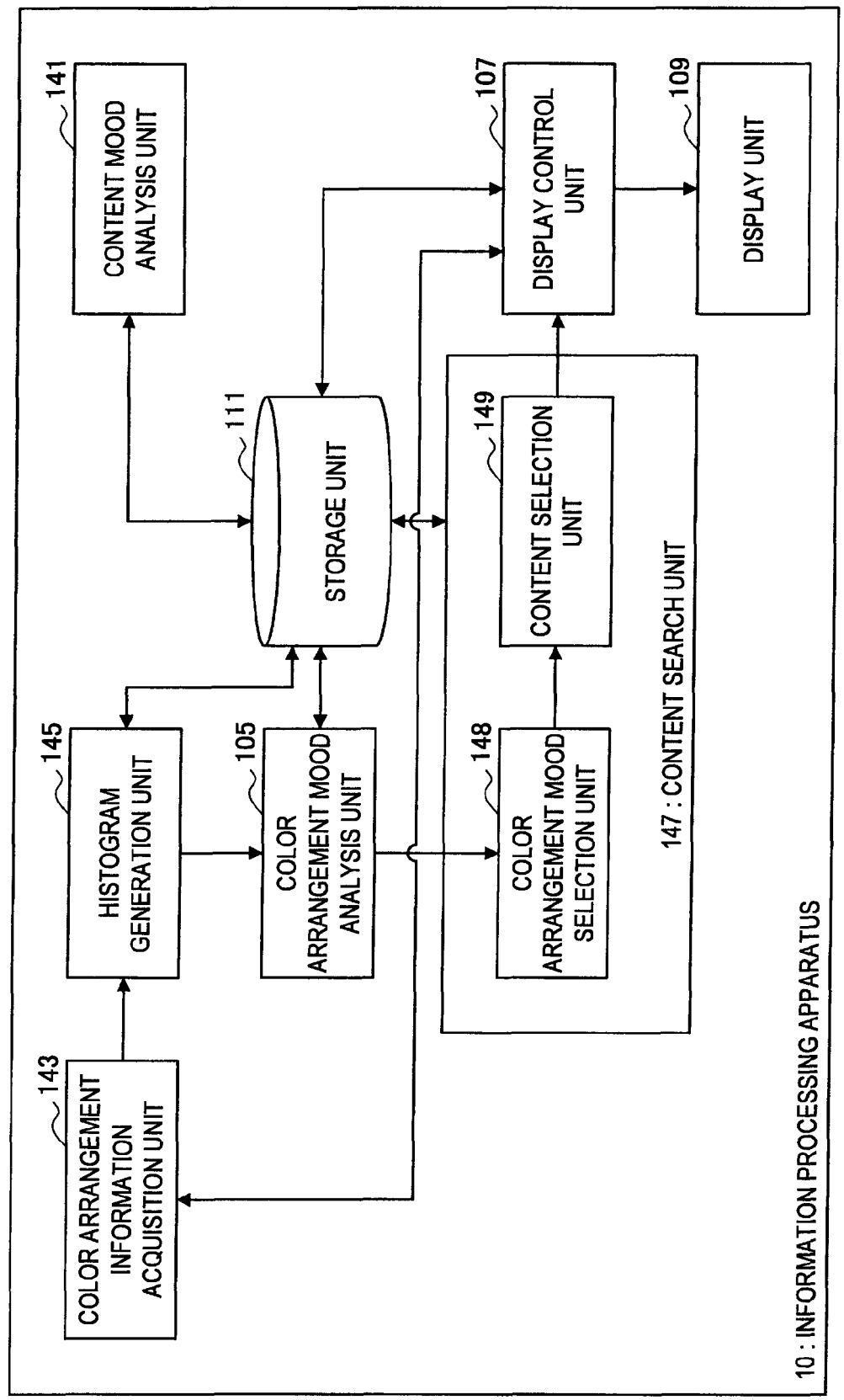
FIG. 10 is a block diagram showing the configuration of the information processing apparatus according to a second embodiment of the present invention.
Figures 11, 12:
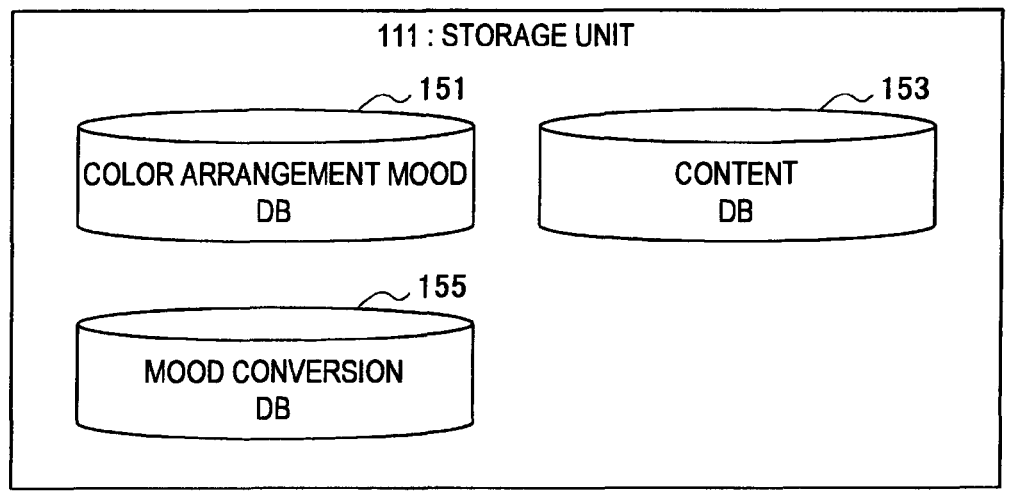
FIG. 11 is an explanatory view exemplifying the configuration of a storage unit according to the embodiment.
FIG. 12 is an explanatory view exemplifying a content database according to the embodiment.

First, the configuration of the information processing apparatus 10 according to the present embodiment will be described in detail with reference to FIGS. 10 and 11. FIG. 10 is a block diagram showing the configuration of the information processing apparatus 10 according to the present embodiment of the present invention and FIG. 11 is an explanatory view showing the configuration of the storage unit 111 according to the present embodiment.

As shown in FIG. 10, the information processing apparatus 10 mainly includes the color arrangement mood analysis unit 105, the display control unit 107, the display unit 109, the storage unit 111, a content mood analysis unit 141, a color arrangement information acquisition unit 143, a histogram generation unit 145, and a content search unit 147.

The color arrangement mood analysis unit 105, the display control unit 107, and the display unit 109 have the same configuration as that of the respective units in the first embodiment and achieve similar operations and thus, a detailed description thereof is omitted below.

The storage unit 111 is an example of the storage apparatus included in the information processing apparatus 10 according to the present embodiment. As shown, for example, in FIG. 11, the storage unit 111 has a color arrangement mood DB 151 described in the first embodiment, a content DB 153 concerning content stored in the storage unit 111, and a mood conversion DB 155 described later stored therein as databases.

In the storage unit 111, various kinds of history information may be recorded. Further, various parameters necessary to store when the information processing apparatus 10 according to the present embodiment performs some kind of processing, the progress of processing, and various databases are recorded in the storage unit 111 when appropriate. Each processing unit included in the information processing apparatus 10 such as the color arrangement mood analysis unit 105, the display control unit 107, the content mood analysis unit 141, the color arrangement information acquisition unit 143, the histogram generation unit 145, and the content search unit 147 can freely read/write information from/to the storage unit 111.

The content mood analysis unit 141 is realized by, for example, a CPU, ROM, RAM and the like. The content mood analysis unit 141 analyzes an atmosphere (mood) provided by content stored in the storage unit 111 to people who have viewed the content.

Atmospheres provided by content include, for example, those representing human emotions such as "happy", "cheerful", "sad", "light", and "heavy", senses of heaviness/lightness, and comfort/discomfort. Content to be analyzed by the content mood analysis unit 141 includes, for example, image content such as still images and dynamic images, music content such as music data, text content, and Web pages.

The content mood analysis unit 141 can analyze not only real data of content, but also various kinds of metadata (for example, thumbnail images of content, jacket photos, and genres of content) associated with content.

Music content will be taken as an example of content in the description below.

The content mood analysis unit 141 acquires music content (including metadata) stored in the storage unit 111 and extracts a characteristic quantity of the music content using a method disclosed in Japanese Patent Application Laid-Open No. 2007-121457 or the like. Then, the content mood analysis unit 141 analyzes the content specific atmosphere (hereinafter, referred to also as the content mood) provided by content to people based on the extracted characteristic quantity.

Based on analysis processing of the content mood performed by the content mood analysis unit 141, metadata (hereinafter, referred to as a mood label) about the content mood is attached to each piece of content. The content mood analysis unit 141 adds the mood label obtained as a result of the analysis to the content DB 153 stored in the storage unit 111 as metadata. As a result, as shown in FIG. 12, the content DB 153 is updated. Though metadata associated with content is not recorded in the content DB 153 shown in FIG. 12, various kinds of metadata such as the storage location of real data, storage location of real data of thumbnail images and jacket photos, and genres of content are associated with each piece of content.

Figures 13, 14:
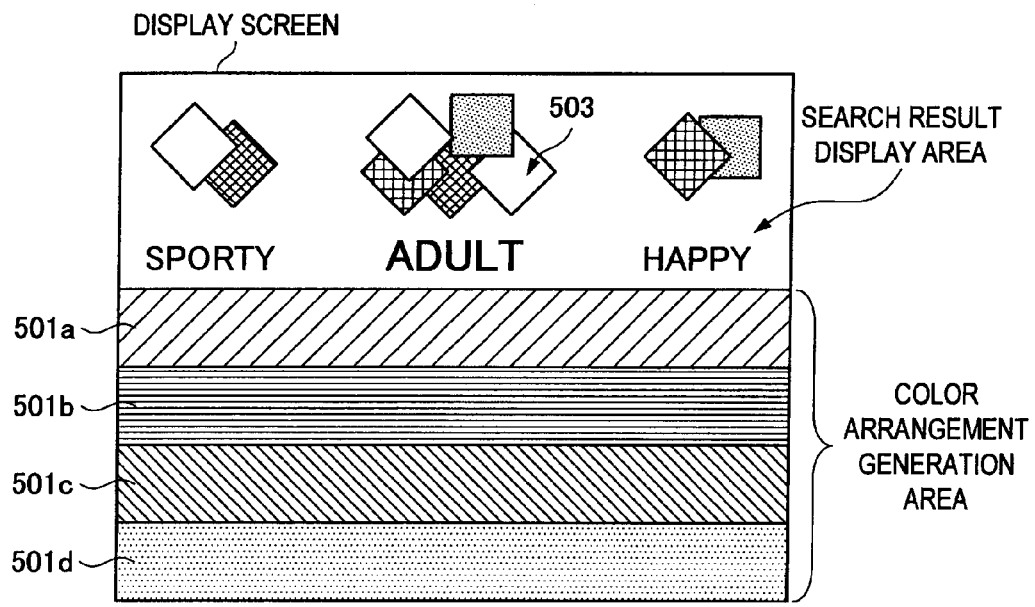
FIG. 13 is an explanatory view exemplifying a mood conversion database according to the embodiment.
FIG. 14 is an explanatory view exemplifying a display screen of the information processing apparatus according to the embodiment.

Next, the content mood analysis unit 141 associates the content mood and color arrangement mood by referring to the mood conversion DB 155 stored in the storage unit 111. FIG. 13 shows an example of the mood conversion DB 155. As is evident from FIG. 13, the mood conversion DB 155 is a DB in which correspondences between the content mood and color arrangement mood are recorded. The content mood analysis unit 141 can decide the color arrangement mood corresponding to content by referring to the mood label, which is metadata associated with each piece of content, and using the mood label and the mood conversion DB 155. After the color arrangement mood corresponding to each piece of content being decided, the content mood analysis unit 141 reflects the results in the content DB 153.

The analysis processing of content by the content mood analysis unit 141 described above is performed in any timing.

The color arrangement information acquisition unit 143 is realized by, for example, a CPU, ROM, RAM, input apparatus and the like. The color arrangement information acquisition unit 143 acquires information (color arrangement information) about the combination of colors to be search conditions (search query) when the content search unit 147 described later searches for content. The color arrangement information acquisition unit 143 causes the display screen to display colors that can be selected by the user via the display control unit 107. The method of displaying colors that can be selected by the user is not specifically limited and the display screen may be caused to display a list of selectable colors as a color palette or the display screen may be caused to display a scroll bar in which the selectable color continuously changes by scroll processing. In this case, the user selects a combination of any colors by operating a mouse pointer or cursor keys while viewing the display screen. The color arrangement information acquisition unit 143 may also allow the user to directly input RGB values or the like of the color to be selected by the user.

The color arrangement information acquisition unit 143 may also allow the user to specify the ratio in which colors are combined. Accordingly, as described in the first embodiment, the area ratio occupied by each color can be determined. Or, the color arrangement information acquisition unit 143 may set the area ratio equally for the selected color combination without allowing the user to specify the ratio in which colors are combined.

After the user-selected color combination being determined, the color arrangement information acquisition unit 143 outputs the obtained color combination as the color arrangement information to the histogram generation unit 145.

The number of colors that can be selected by the user is not specifically limited, but it is preferable to select as many colors as possible from a color space to increase the selection of the user. Moreover, in consideration of the appearance of the display screen, it is preferable to constitute color patterns by selecting a tone of bright color combinations from a commonly used color wheel by tone and adding gray-scale colors to the selected tone. The tone is a concept combining the lightness and saturation and a sense of unity can be provided to the display screen by using colors of the same tone or similar tones.

The histogram generation unit 145 is realized by, for example, a CPU, ROM, RAM, and the like. The histogram generation unit 145 has the same configuration and achieves the same operation as those of the histogram generation unit 125 according to the first embodiment except that the histogram generation unit 145 generates a color histogram based on color arrangement information output from the color arrangement information acquisition unit 143. After a color histogram being generated based on color arrangement information output from the color arrangement information acquisition unit 143, the histogram generation unit 145 outputs the generated color histogram to the color arrangement mood analysis unit 105. Accordingly, the color arrangement mood analysis unit 105 can analyze the color arrangement mood corresponding to the color histogram.

The present embodiment describes a case in which the combination of colors used as a search query is specified by the user and thus, the attention value calculation unit and the subtractive color processing unit described in the first embodiment are not provided between the color arrangement information acquisition unit 143 and the histogram generation unit 145. However, if, for example, a function to search for content after the user inputs an image to be used for a search query and the atmosphere of the input image is analyzed or the like should be realized, the attention value calculation unit and the subtractive color processing unit described in the first embodiment may be provided.

The content search unit 147 is realized by, for example, a CPU, ROM, RAM and the like. The content search unit 147 searches for content stored in the storage unit 111 or the like based on analysis results concerning the color arrangement mood output from the color arrangement mood analysis unit 105. As shown in FIG. 10, the content search unit 147 further includes a color arrangement mood selection unit 148 and a content selection unit 149.

The color arrangement mood selection unit 148 is realized by, for example, a CPU, ROM, RAM and the like. The color arrangement mood selection unit 148 selects one or a plurality of color arrangement moods in ascending order of value by referring to analysis results (for example, a list of representative similarity distances shown in FIG. 6) output from the color arrangement mood analysis unit 105. The number of color arrangement moods selected by the color arrangement mood selection unit 148 is not specifically limited, but it is preferable to set the number thereof based on the size of the display screen or the like. By selecting the plurality of color arrangement moods, a plurality of kinds of content corresponding to the color arrangement mood that could correspond to the color arrangement information specified by the user can be selected and therefore, the selection of the user can be increased.

After the color arrangement mood to be selected being decided, the color arrangement mood selection unit 148 outputs information about the selected color arrangement mood to the content selection unit 149.

The content selection unit 149 is realized by, for example, a CPU, ROM, RAM and the like. The content selection unit 149 selects content stored in the storage unit 111 or the like based on the color arrangement mood selected by the color arrangement mood selection unit 148. More specifically, the content selection unit 149 refers to the content DB 153 stored in the storage unit 111 to select content associated with the color arrangement mood which matches the color arrangement mood notified from the color arrangement mood selection unit 148. Accordingly, the information processing apparatus 10 according to the present embodiment can search for concrete content by using an abstract concept of color combination as a search query.

The content selection unit 149 outputs information about the selected content to the display control unit 107. The display control unit 107 can present information about content selected by the user by causing the display screen of the display unit 109 to display information about the selected content.

The information processing apparatus 10 according to the present embodiment may be realized as a computer such as a personal computer and various servers or as a mobile electronic device such as a mobile music player, mobile game machine, mobile phone, smart phone, and PDA. Or, the information processing apparatus 10 according to the present embodiment may be realized as a digital video camera, digital still camera, or car navigation system.

In the foregoing, an example of the function of the information processing apparatus 10 has been shown. Each of the above structural elements may be configured by using common members or circuits or hardware specialized to the function of each structural element. Or, the function of each structural element may all be executed by a CPU or the like. Therefore, elements to be used can be changed when appropriate in accordance with the technical level when the present invention is carried out.

A computer program to realize each function of an information processing apparatus according to the present embodiment described above may be created and implemented on a personal computer or the like. Or, a computer readable recording medium in which such a computer program is stored may be provided. The recording medium is, for example, a magnetic disk, optical disk, magneto-optical disk, or flash memory. The above computer program may be delivered via, for example, a network without using any recording medium.

<Examples of the Display Screen>

Examples of the display screen (that is, graphical user interfaces) provided by the information processing apparatus 10 according to the present embodiment will be described in detail with reference to FIGS. 14 to 19 by showing concrete examples. FIGS. 14 to 19 are explanatory views showing examples of the display screen of an information processing apparatus according to the present embodiment.

FIG. 14 is an example of the display screen displayed in the display unit 109 according to the present embodiment. Content of the display screen displayed in the display unit 109 is controlled by the display control unit 107 included in the information processing apparatus 10 according to the present embodiment.

The display screen includes, as shown in FIG. 14, a color arrangement generation area in which scroll bars 501a to 501d used by the user to select a combination of colors is displayed and a search result display area in which results of a search performed based on the color arrangement selected in the color arrangement generation area are displayed.

The user of the information processing apparatus 10 operates the scroll bar 501 displayed in the color arrangement generation area by using a mouse, keyboard or the like to set a combination of colors desired by the user. In FIG. 14, the four scroll bars 501 are provided adjacent to each other. Therefore, in the example shown in FIG. 14, content is searched for after the user specifies a combination of four colors.

The user selects a desired combination of colors by moving each of the scroll bars 501. It is preferable that each of the scroll bars 501 move following the user's operation. It is also preferable that the pattern of color displayed in each of the scroll bars 501 be identical. Accordingly, the user can freely combine colors just as the user thinks fit.

The color displayed in each of the scroll bars 501 can suitably be selected from, for example, a color wheel by tone, but each of the scroll bars 501 can be caused to display, for example, combinations of colors below.

More specifically, a total of 42 colors combining 15 colors obtained by dividing the color wheel "Strong" into 15 colors, 15 colors obtained by dividing the color wheel "Light" into 15 colors, six colors obtained by dividing the color wheel "Pale" into six colors, and six colors obtained by dividing a gray scale into six colors of the color wheel by tone may be displayed.

When the combination of four colors is specified by the user, the information processing apparatus 10 searches for content according to the procedure described above. As a result, color arrangement moods corresponding to the color combination selected by the user and objects 503 representing content associated with the color arrangement moods are displayed in the search result display area. Objects representing content include thumbnail images corresponding to a portion of the substance of content and jacket photos of content.

Figure 15:
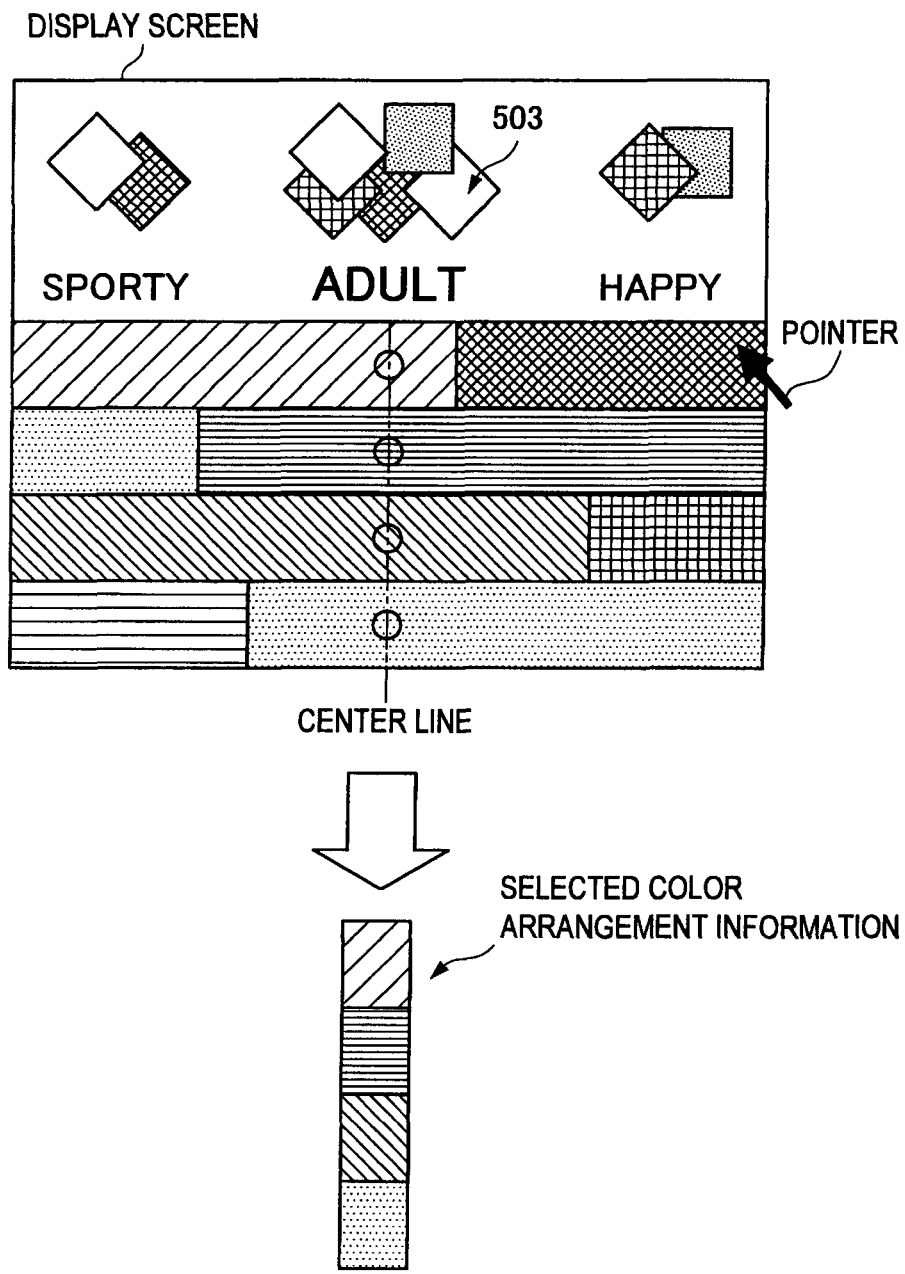
FIG. 15 is an explanatory view exemplifying the display screen of the information processing apparatus according to the embodiment.

As shown in FIG. 15, the color arrangement information acquisition unit 143 judges for each of the scroll bars 501 that the color displayed in a portion positioned in a substantial center (for example, within one pixel of the center) in the width direction is the color selected by the user. Therefore, content is searched for each time the color in a substantial center portion in each of the scroll bars 501 changes and search results are displayed in the search result display area.

Figure 16:
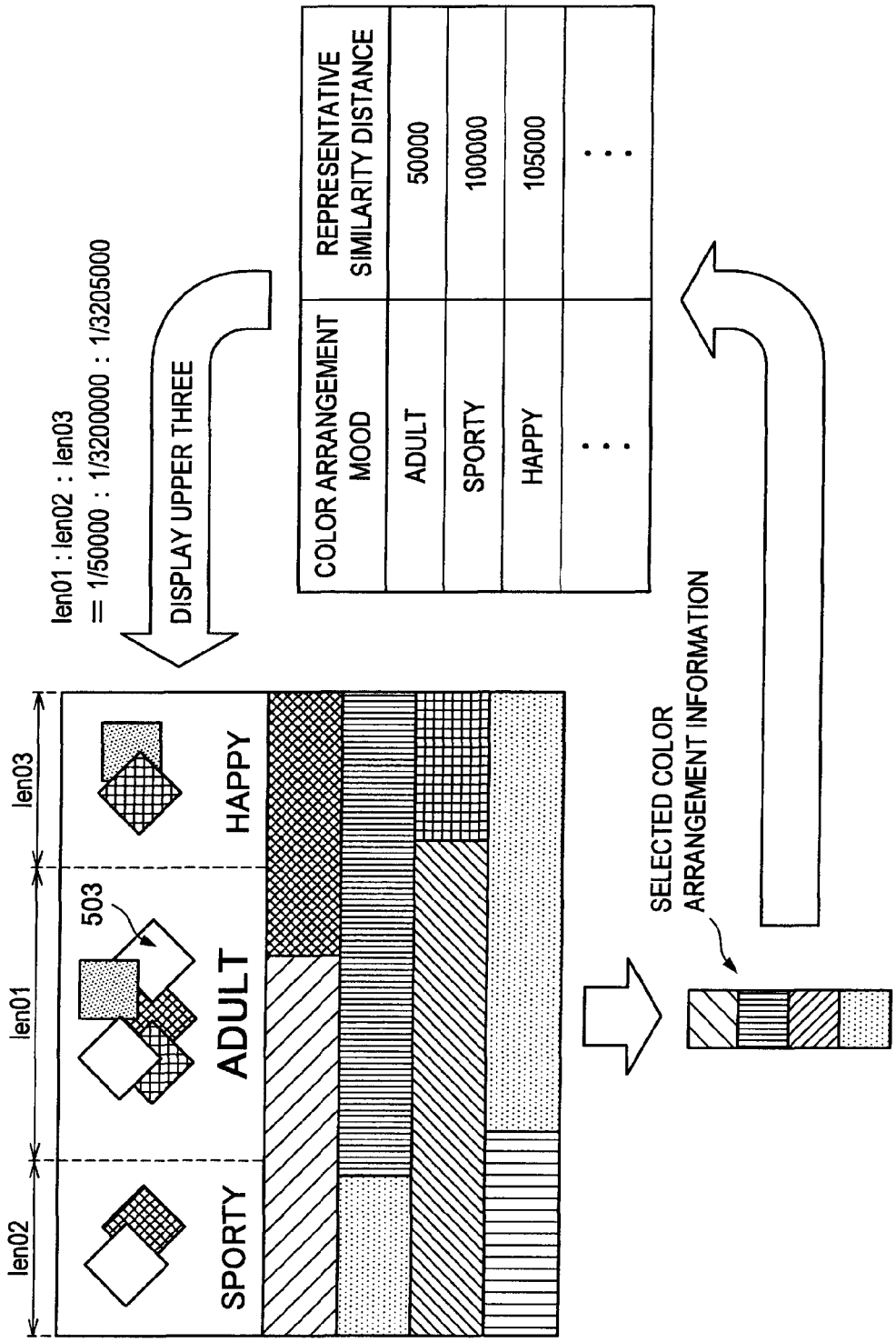
FIG. 16 is an explanatory view exemplifying the display screen of the information processing apparatus according to the embodiment.

FIG. 16 is an explanatory view showing the flow of a sequence of processing until search results of content are displayed in the display screen after a combination of colors is selected by the user. When the user operates the scroll bar 501 to select the combination of colors, the color arrangement information acquisition unit 143 outputs the combination of selected colors to the histogram generation unit 145 as color arrangement information. The histogram generation unit 145 generates a color histogram based on the selected color arrangement information and outputs the color histogram to the color arrangement mood analysis unit 105. The color arrangement mood analysis unit 105 calculates similarity distances between the notified color arrangement information and registered color arrangement information by the method described in detail in the first embodiment or the like to decide the representative similarity distance for each color arrangement mood. The color arrangement mood selection unit 148 sorts calculated representative similarity distances in ascending order of value to select, for example, first three color arrangement moods as the color arrangement moods used for searching. The content selection unit 149 then searches for each of the selected color arrangement mood and outputs obtained search results to the display content unit 107.

When displaying search results in the search result display area, the display control unit 107 decides the size of the object 503 to be displayed, the size of characters representing the color arrangement mood, and the size of the display area corresponding to each color arrangement mood based on the representative similarity distance. Then, for example, the mood closest to the color arrangement information is arranged in the center of the display screen, the second closest mood to the left of the closest mood, and the third closest mood to the right of the closest mood. If a plurality of the objects 503 is present when the objects 503 representing content are displayed, as shown in FIG. 16, the objects 503 may be arranged in such a way that the objects 503 overlap one another. Accordingly, the closer the mood to color arrangement information serving as a search query, the larger the object is displayed in the center of the display screen. Therefore, the user can operate the scroll bar 501 while knowing to which atmosphere the color arrangement selected by the user is close in real time.

In the example shown in FIG. 16, for example, representative similarity distances are 50000, 100000, and 105000 and a ratio len01:len02:len03 of the size of the display area becomes a ratio of the inverse of the representative similarity distance.

When, as shown in FIG. 17, a predetermined time passes after all the scroll bars 501 are stopped, the display control unit 107 may control exercise to move the scroll bars 501 automatically so that each of the scroll bars 501 is displayed in a single color occupying at least half each of the scroll bars 501 when stopped.

The user can also drag the object 503 displayed in the search result display area into the color arrangement generation area by operating a mouse, keyboard or the like. In this case, it is preferable that other objects than the selected object also move in synchronization. The display control unit 107 arranges the objects 503 associated with the applicable color arrangement mood in the color arrangement generation area by avoiding overlapping as much as possible. The color arrangement in the objects 503 is frequently similar to that constituted of the four scroll bars 501, which makes the display screen more natural.

Figure 18:
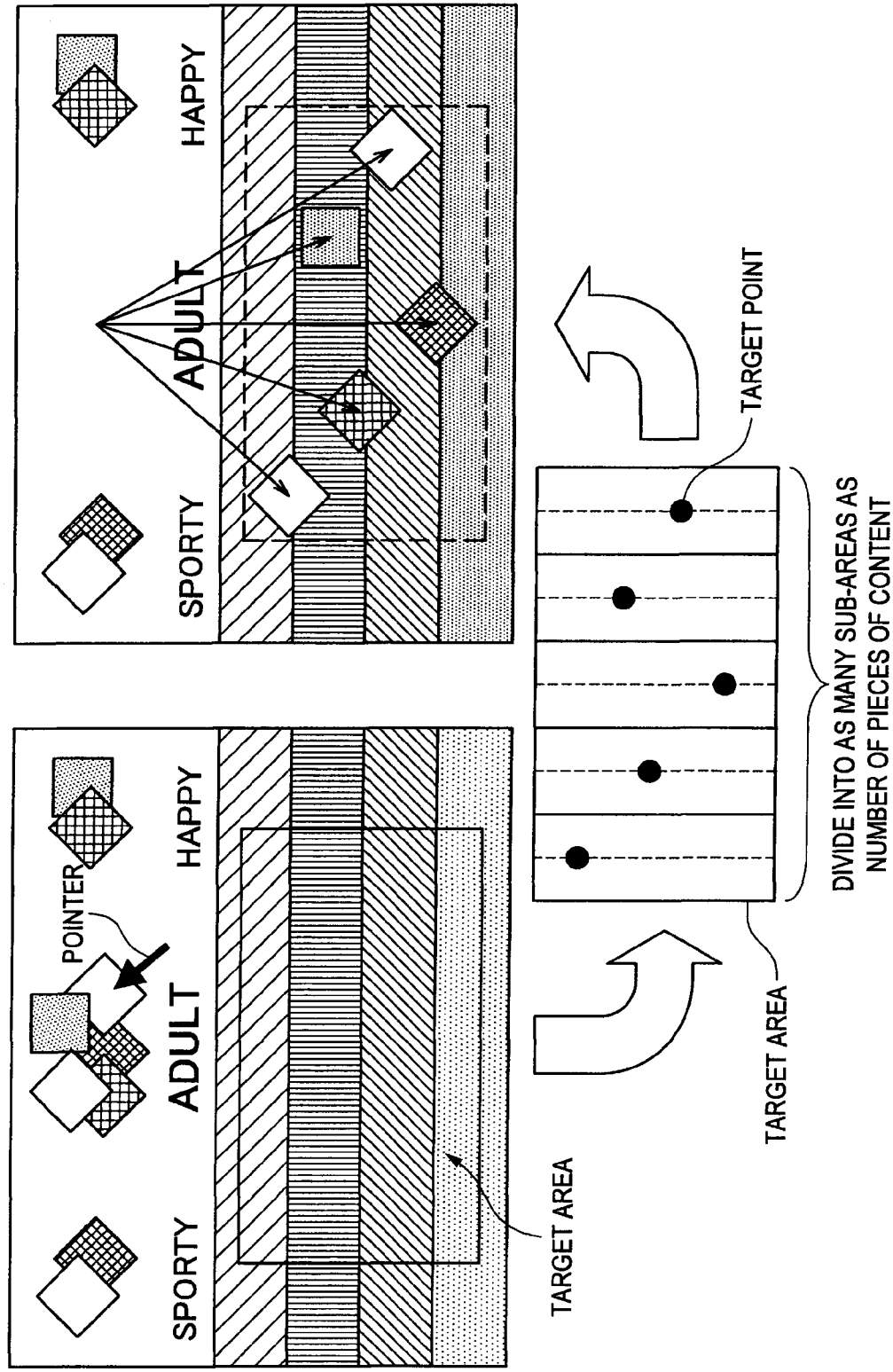
FIG. 18 is an explanatory view exemplifying the display screen of the information processing apparatus according to the embodiment.

To avoid overlapping of the objects 503, the display control unit 107 decides the arrangement location of the object 503 by a method shown in FIG. 18. That is, the display control unit 107 decides a target area to arrange the objects 503 in accordance with the size of the display screen or the color arrangement generation area. Then, the display control unit 107 arranges the objects 503 inside the target area.

The display control unit 107 divides the width of the target area into as many sub-areas as the number of the objects 503 to be displayed. In the example shown in FIG. 18, for example, the number of the objects 503 to be displayed is five and the display control unit 107 divides the width of the target area into five sub-areas.

Subsequently, the display control unit 107 decides the target point where the object 503 is arranged for each sub-area. The display control unit 107 sets the center of the width of each sub-area as the position of the target point in the width direction. Then, the display control unit 107 randomly decides the position of the target point in the height direction. Thereafter, the display control unit 107 moves each of the objects 503 to the target points decided as described above.

Figure 19:
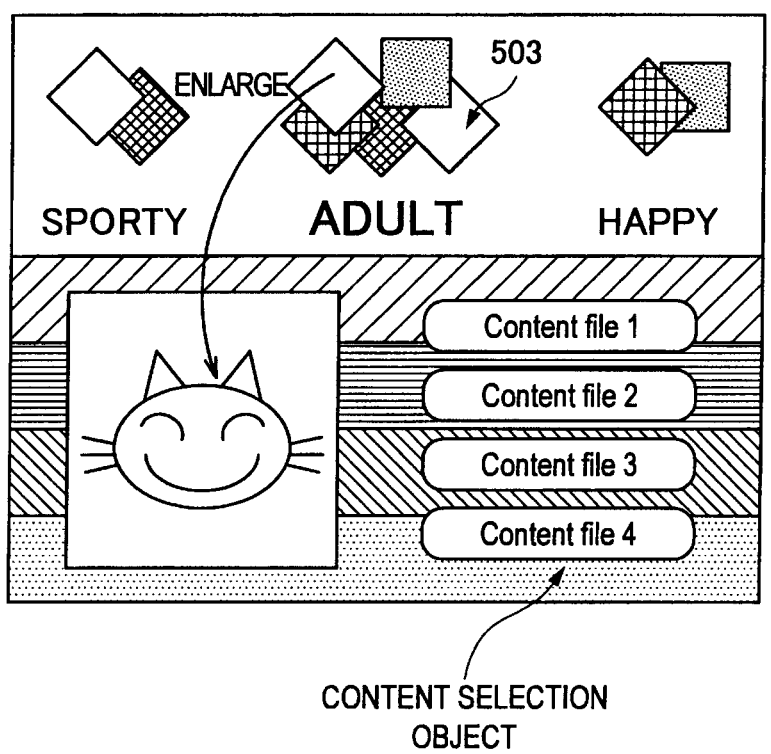
FIG. 19 is an explanatory view exemplifying the display screen of the information processing apparatus according to the embodiment.

Further, the user can select some object 503 by double-clicking the object 503 displayed in the search result display area by operating a mouse, keyboard or the like. In this case, as shown in FIG. 19, the display control unit 107 causes the color arrangement generation area to display the selected object 503 as an enlarged view thereof. If content corresponding to the object 503 is album content in which a plurality of pieces of music content is collected or dynamic picture content to which chapters are set, the display control unit 107 causes the color arrangement generation area to display also a content selection object to select such content.

In the foregoing, examples of graphical user interfaces provided by the information processing apparatus 10 according to the present embodiment have been described with reference to FIGS. 14 to 19 by showing concrete examples.

<Information Processing Method>

Figure 20:
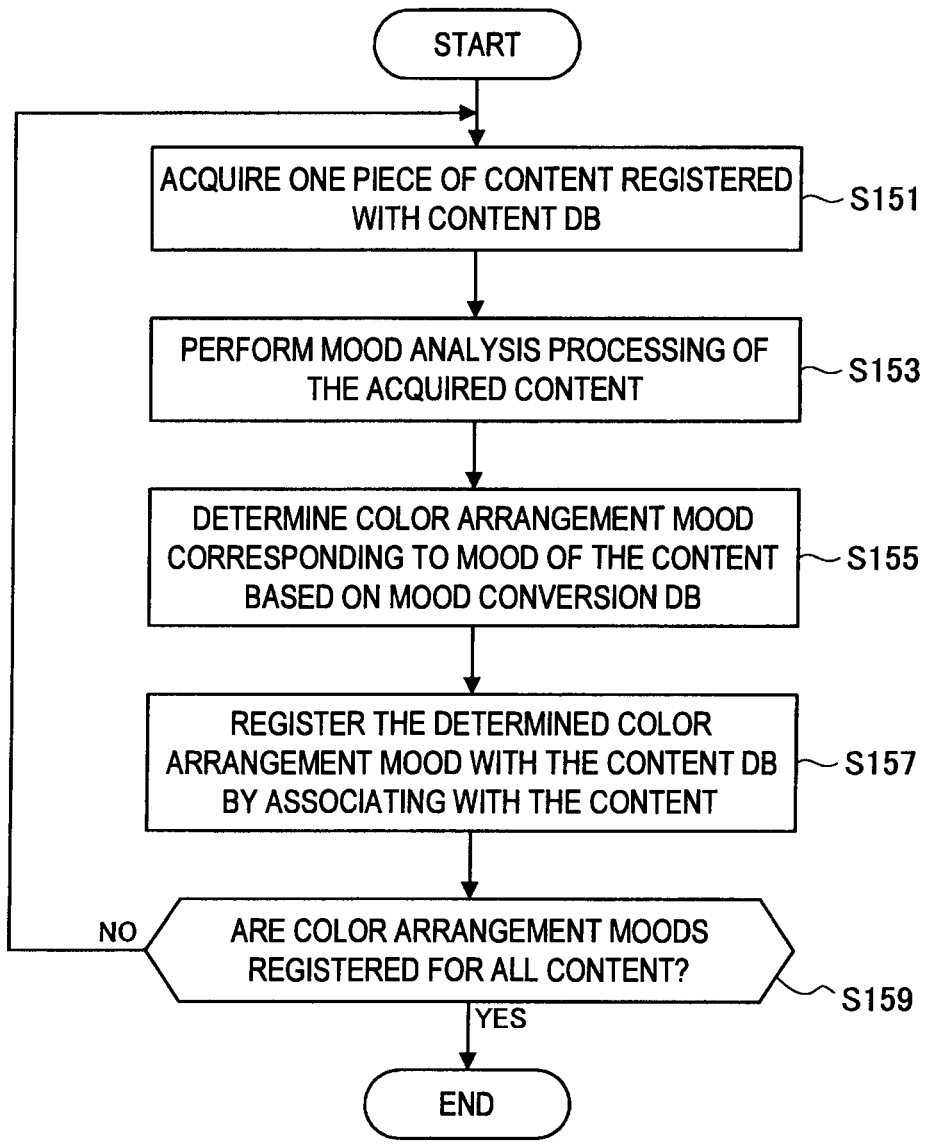
FIG. 20 is a flow chart showing the flow of associating the color arrangement mood with content in the embodiment.
Figure 21:
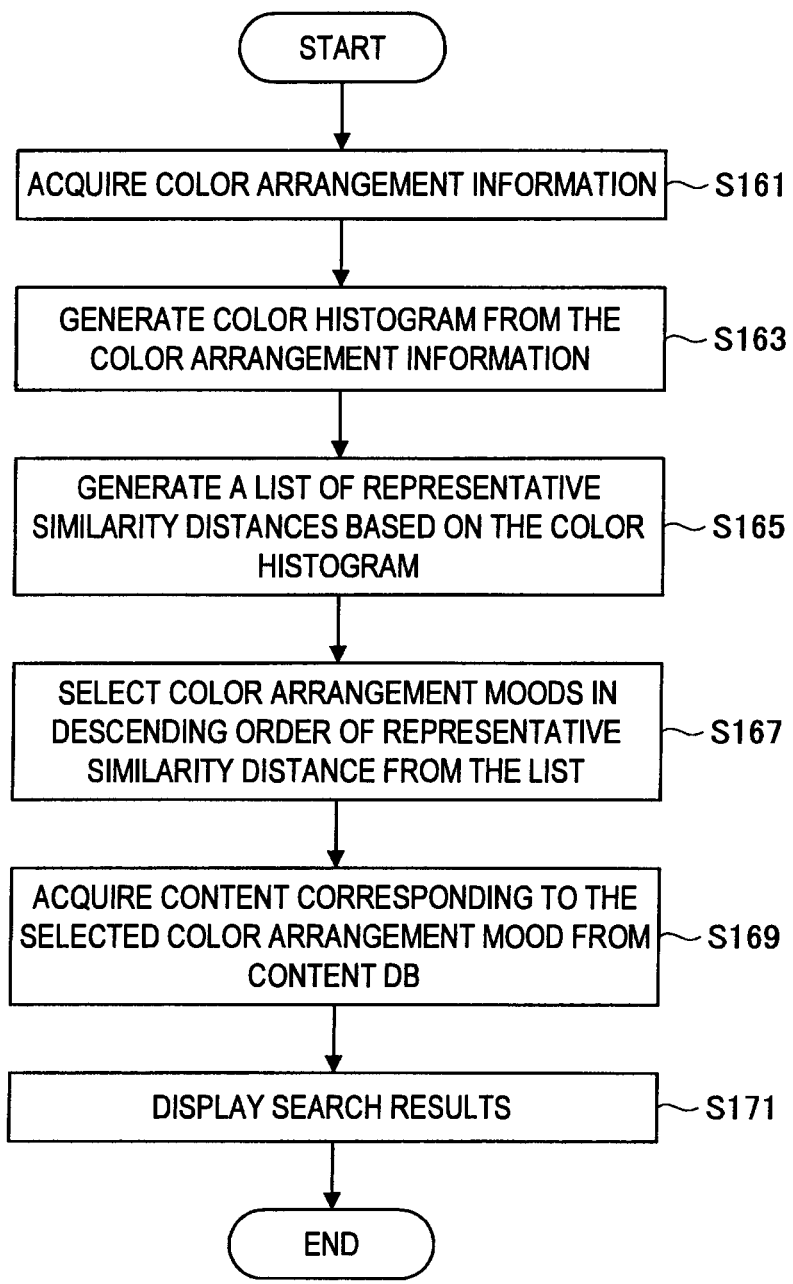
FIG. 21 is a flow chart showing the flow of the information processing method according to the embodiment.

Subsequently, the flow of the information processing method executed by the information processing apparatus 10 according to the present embodiment will be described with reference to FIGS. 20 and 21.

[Association of the Color Arrangement Mood]

First, the flow of associating the color arrangement mood with content in the present embodiment will be described with reference to FIG. 20. FIG. 20 is a flow chart showing the flow of associating the color arrangement mood with content in the present embodiment.

First, the content mood analysis unit 141 of the information processing apparatus 10 acquires one piece of content registered in the content DB 153 by referring to the database stored in the storage unit 111 (step S151). Next, the content mood analysis unit 141 performs mood analysis processing of the acquired content (including metadata) by using one of various methods described above (step S153). Accordingly, the atmosphere (mood) provided by the content to people who have viewed the content can be determined.

Next, the content mood analysis unit 141 determines the color arrangement mood corresponding to the mood of the content by referring to the mood conversion DB 155 stored in the storage unit 111 (step S155). Subsequently, the content mood analysis unit 141 associates the determined color arrangement mood with the content and registers the associated color arrangement mood with the content DB 153 (step S157). Accordingly, the atmosphere (content mood) provided by content to people and the color arrangement mood are associated as metadata of the content in the content DB 153.

Subsequently, the content mood analysis unit 141 determines whether the color arrangement mood has been registered for all content registered with the content DB 153 (step S159). If the color arrangement mood has not yet been registered for all content, the content mood analysis unit 141 returns to step S151 to continue the processing for content for which the color arrangement mood is not registered. If the color arrangement mood has been registered for all content, the content mood analysis unit 141 terminates the processing.

By performing the processing in the above flow, the content mood analysis unit 141 can associate two kinds of metadata, the mood of content and the color arrangement mood, for the content.

[Flow of the Search Method of Content]

Subsequently, the flow of the information processing method (search method of content) executed in the information processing apparatus 10 according to the present embodiment will be described with reference to FIG. 21. FIG. 21 is a flow chart showing the flow of the information processing method according to the present embodiment.

Before starting the description below, it is assumed that the color arrangement mood as metadata of content is already associated by the processing illustrated in FIG. 20 in the content DB 153 stored in the storage unit 111.

First, the color arrangement information acquisition unit 143 of the information processing apparatus 10 acquires color arrangement information indicating the combination of colors selected by the user (step S161) and outputs the combination to the histogram generation unit 145. The histogram generation unit 145 generates a color histogram based on color arrangement information notified from the color arrangement information acquisition unit 143 (step S163). The color histogram generated in this manner is used as a search query (search condition) when content is searched for. When generation of the color histogram is finished, the histogram generation unit 145 outputs the generated color histogram to the color arrangement mood analysis unit 105.

The color arrangement mood analysis unit 105 calculates the representative similarity distance for each color arrangement mood recorded in the color arrangement mood DB 151 based on the color histogram notified from the histogram generation unit 145 to create a list of representative similarity distances (step S165). After the list of representative similarity distances being created, the color arrangement mood analysis unit 105 outputs the created list to the color arrangement mood selection unit 148 of the content search unit 147.

The color arrangement mood selection unit 148 selects the color arrangement mood in ascending order of representative similarity distance from the list (step S167) and outputs the selected color arrangement mood to the content selection unit 149. The content selection unit 149 searches the content DB 153 based on notified color arrangement moods to acquire content corresponding to the notified color arrangement moods (step S169). Accordingly, concrete content is searched for based on abstract search conditions of the combination of colors specified by the user. The content selection unit 149 outputs obtained search results to the display control unit 107.

The display control unit 107 displays notified search results in the display unit 109 using GUIs as illustrated in FIGS. 14 to 19 (step S171). Accordingly, the user can know search results of content.

In the foregoing, an example of the flow of the information processing method executed in the information processing apparatus 10 according to the present embodiment has been described with reference to FIGS. 20 and 21.

Thus, in an information processing apparatus and an information processing method according to the present embodiment, content can be searched for based on an abstract concept of color arrangement.

Moreover, the display screen (GUI) according to the present embodiment shown in FIGS. 14 to 19 can provide a new style of content search method by which content is searched for by zapping scroll bars in which colors are displayed.

The user of the information processing apparatus 10 can create a color arrangement while causing the display screen to display search results matching scrolling of scroll bars in real time and knowing how close the currently displayed color arrangement to which mood. Accordingly, the user can easily perform a search using various color arrangements successively or search for a desired color arrangement mood.

Since a color arrangement is created by scrolling scroll bars of colorful color arrangements, the appearance of the application is good even while creating a color arrangement and the operation method is intuitive and simple, making the process of color arrangement generation comfortable to the user. Moreover, even in a narrow display area, it is possible to roughly know which content is in what quantity by displaying content by piling up the content. It also becomes possible to display content by dragging the content onto a color arrangement of the same mood as that of the content and therefore, an effect of making the appearance of displaying a list of content better is achieved.

Third Embodiment

In the second embodiment described above, an information processing apparatus that realizes a function to search for content by using an abstract matter of color arrangement mood has been described, but it is also possible to automatically provide a template for content display appropriate for content by using an abstract matter of color arrangement mood. The information processing apparatus 10 according to the third embodiment described below is an apparatus that realizes a function to automatically provide a display template appropriate for a color arrangement mood of content by analyzing the color arrangement mood of content.

In an image browsing application, for example, a template to be a background image can be set for images (content). However, the user commonly selects and uses a template from templates prepared for the application and selecting the template by examining one template after another from innumerable template is tremendous time and efforts for the user. If templates prepared by the application are fixed templates, the color arrangement of a template may not necessarily fit images (content). Thus, the information processing apparatus described below analyzes the color arrangement mood of content and automatically provides a display template appropriate for the color arrangement mood of the content to a user.

<Configuration of the Information Processing Apparatus>

Figure 22:
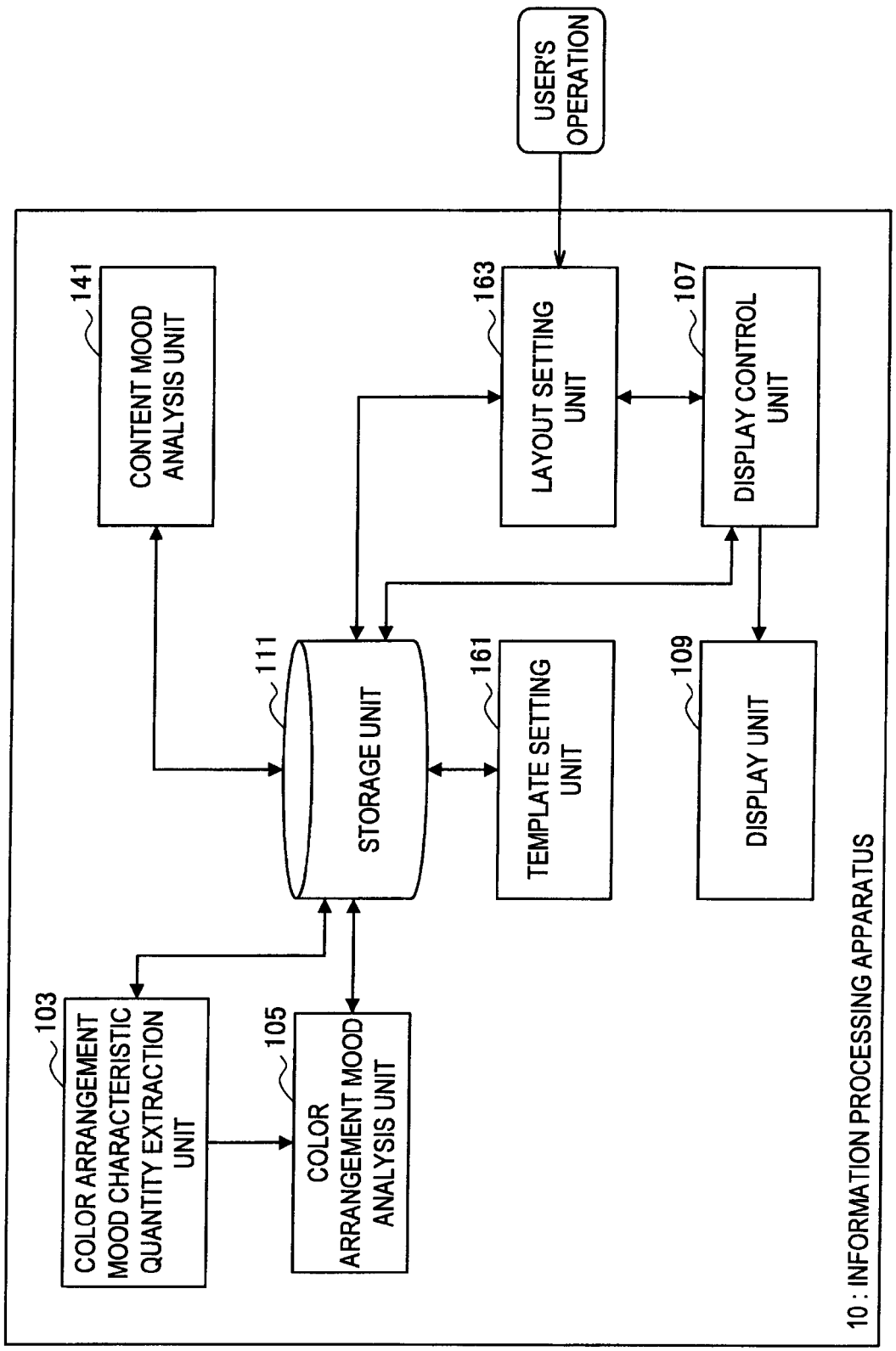
FIG. 22 is a block diagram showing the configuration of the information processing apparatus according to a third embodiment of the present invention.
Figure 23:
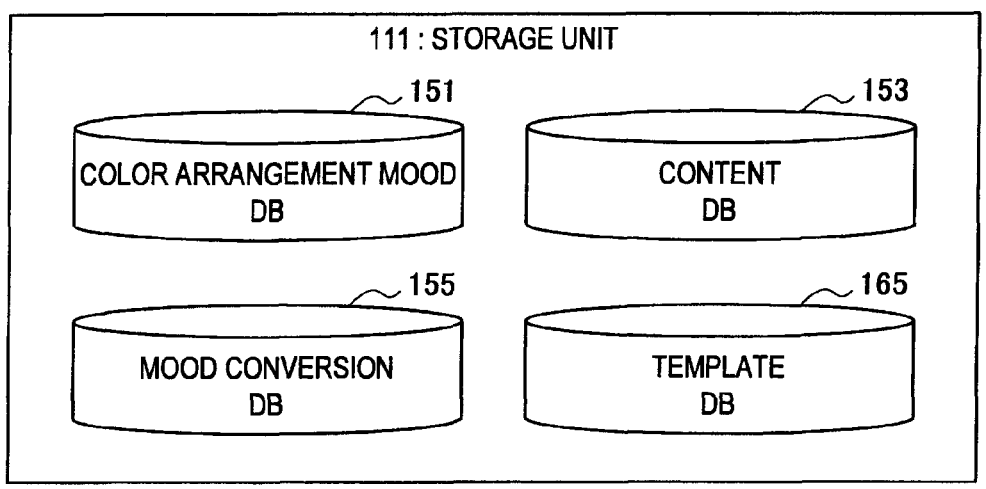
FIG. 23 is an explanatory view exemplifying the configuration of the storage unit according to the embodiment.

First, the configuration of the information processing apparatus 10 according to the present embodiment will be described with reference to FIGS. 22 and 23. FIG. 22 is a block diagram showing the configuration of the information processing apparatus 10 according to the present embodiment and FIG. 23 is an explanatory view showing the configuration of the storage unit 111 according to the present embodiment.

As shown in FIG. 22, the information processing apparatus 10 mainly includes the color arrangement mood characteristic quantity extraction unit 103, the color arrangement mood analysis unit 105, the display control unit 107, the display unit 109, the storage unit 111, the content mood analysis unit 141, a template setting unit 161, and a layout setting unit 163.

The color arrangement mood characteristic quantity extraction unit 103 has the same configuration as that of the color arrangement mood characteristic quantity extraction unit 103 according to the first embodiment of the present invention and achieves similar operations except that a color arrangement mood characteristic quantity is extracted from content stored in the storage unit 111. Thus, a detailed description thereof is omitted below.

As described in the first embodiment, while a color histogram is generated as a color arrangement mood characteristic quantity by the color arrangement mood characteristic quantity extraction unit 103 according to the present embodiment, the color arrangement mood characteristic quantity extraction unit 103 may store the generated color histogram in the storage unit 111 or the like so that other processing units can use the color histogram.

The color arrangement mood analysis unit 105, the display control unit 107, and the display unit 109 have the same configuration as that of the respective units in the first and second embodiments and achieve similar operations and thus, a detailed description thereof is omitted below.

Further, the content mood analysis unit 141 has the same configuration as that of the content mood analysis unit 141 according to the second embodiment of the present invention and achieves similar operations and thus, a detailed description thereof is omitted below.

The storage unit 111 is an example of the storage apparatus included in the information processing apparatus 10 according to the present embodiment. As shown, for example, in FIG. 23, the storage unit 111 has the color arrangement mood DB 151 described in the first embodiment, the content DB 153 concerning content stored in the storage unit 111, and the mood conversion DB 155 stored therein as databases. Further, the storage unit 111 according to the present embodiment has a template DB 165, which is a database concerning templates used when content is displayed stored therein.

FIG. 24 shows an example of the template DB 165. As shown in FIG. 24, the template DB 165 is a database in which various templates associated with each of color arrangement moods are recorded and each template provides an atmosphere corresponding to the associated color arrangement mood to people. These templates are image data composed of an area where content such as image content, music content, text content, and Web pages is pasted and an area to be a background image of the pasted content. The area to be a background image can be divided and applied in different colors.

In the storage unit 111, various kinds of history information may be recorded. Further, various parameters necessary to store when the information processing apparatus 10 according to the present embodiment performs some kind of processing, the progress of processing, and various databases are recorded in the storage unit 111 when appropriate. Each processing unit included in the information processing apparatus 10 such as the color arrangement mood characteristic quantity extraction unit 103, the color arrangement mood analysis unit 105, the display control unit 107, the content mood analysis unit 141, the template setting unit 161, and the layout setting unit 163 can freely read/write information from/to the storage unit 111.

The template setting unit 161 is realized by, for example, a CPU, ROM, RAM and the like. The template setting unit 161 automatically sets a template appropriate for content regarding each piece of content registered with the content DB 153 of the storage unit 111. The template set by the template setting unit 161 is used as a default setting (template displayed first) when content is displayed in the display screen and the type of template associated with content and the like can freely be changed by the layout setting unit 163 described later.

The template setting unit 161 refers to the content DB 153 and if there is content for which no template is set, determines the color arrangement mood of the content. After the color arrangement mood corresponding to the content being determined, the template setting unit 161 selects a template associated with the applicable color arrangement mood by referring to the template DB 165 and sets the template as the default template. Which template to select from among templates associated with the applicable color arrangement mood can be set when appropriate and, for example, the template to which the smallest template ID is attached may be selected or a template may randomly be selected from a plurality of templates.

After the default template being decided, the template setting unit 161 selects a color arrangement pattern corresponding to the applicable color arrangement mood from the color arrangement mood DB 151 to select the default color arrangement. If a generated color histogram is recorded for the focused content, the color arrangement pattern closest to the generated color histogram may be selected.

As shown in FIG. 24, a number (ID) is attached to the template in an area to be the background image. The ID is attached when appropriate based on, for example, one of criteria as shown below:

(a) In descending (or ascending) order of area (b) In order in which colors of high (or low) saturation should be assigned (c) In order in which colors of high (or low) lightness should be assigned The template setting unit 161 associates the ID and color arrangement for the area to be the background image. Any method may be adopted as a method of associating the color with an area of each ID and, for example, one of the following methods can be used:

(a) Assign the color in the color arrangement in descending (or ascending) order of area to the ID starting with ID1

(b) Assign the color in the color arrangement in descending (or ascending) order of saturation to the ID starting with ID1

(c) Assign the color in the color arrangement in descending (or ascending) order of lightness to the ID starting with ID1

If the template ID is attached by focusing on the area and the color is arranged by focusing on the area, the area ratio of each color in the color arrangement mood DB 151 can be brought closer to that of each area in the template so that the mood provided by the color arrangement can be expressed more accurately.

After the template to be set and the color arrangement in template being decided for each piece of content, the template setting unit 161 registered decided contents with the content DB 153. Accordingly, the content DB 153 has items as shown in FIG. 25 as metadata additionally registered therewith. In the example shown in FIG. 25, the color arrangement mood corresponding to content, template ID, color arrangement pattern ID, color INDEXES of colors used in the template are newly additionally recorded for each piece of content.

The layout setting unit 163 is realized by, for example, a CPU, ROM, RAM, input apparatus and the like. When the start of processing to cause the display screen to display some piece of content is specified by a user's operation, the layout setting unit 163 causes the display unit 109 to display the content via the display control unit 107 by using a template recorded in the content DB 153 stored in the storage unit 111. When a default template is changed or a color arrangement pattern is changed by a user's operation, contents of the content DB 153 are updated by making a setting change in accordance with the user's operation. The user of the information processing apparatus 10 according to the present embodiment can freely change various settings set by the template setting unit 161 by operating various objects for setting change displayed in the display screen.

The information processing apparatus 10 according to the present embodiment may be realized as a computer such as a personal computer and various servers or as a mobile electronic device such as a mobile music player, mobile game machine, mobile phone, smart phone, and PDA. Or, the information processing apparatus 10 according to the present embodiment may be realized as a digital video camera, digital still camera, or car navigation system.

In the foregoing, an example of the function of the information processing apparatus 10 according to the present embodiment has been shown. Each of the above structural elements may be configured by using common members or circuits or hardware specialized to the function of each structural element. Or, the function of each structural element may all be executed by a CPU or the like. Therefore, elements to be used can be changed when appropriate in accordance with the technical level when the present invention is carried out.

A computer program to realize each function of an information processing apparatus according to the present embodiment described above may be created and implemented on a personal computer or the like. Or, a computer readable recording medium in which such a computer program is stored may be provided. The recording medium is, for example, a magnetic disk, optical disk, magneto-optical disk, or flash memory. The above computer program may be delivered via, for example, a network without using any recording medium.

<Example of the Display Screen>

Next, an example of the display screen (GUI) displayed in the display unit 109 of the information processing apparatus 10 according to the present embodiment will be described with reference to FIG. 26.

Figure 26:
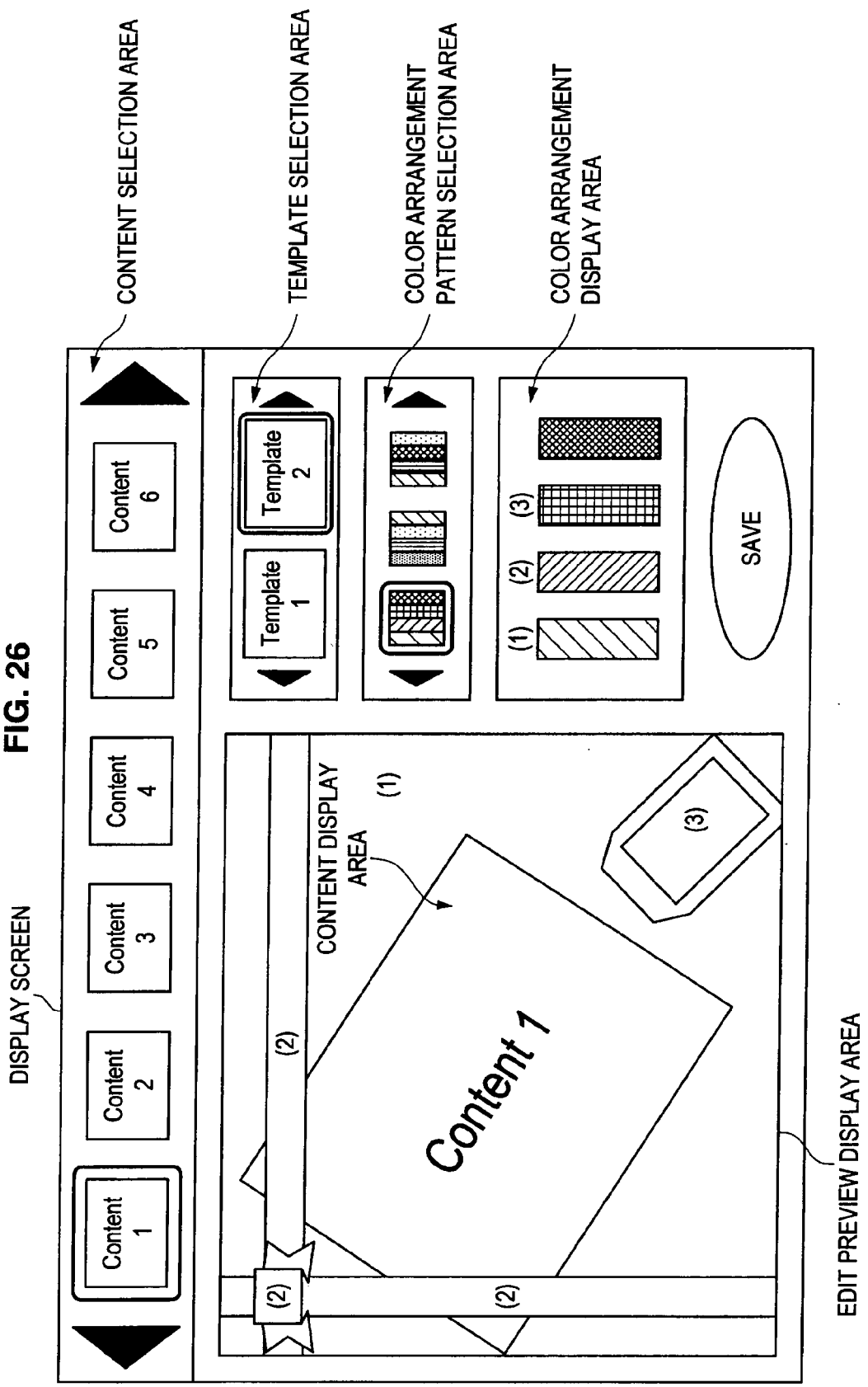
FIG. 26 is an explanatory view exemplifying the display screen of the information processing apparatus according to the embodiment.

FIG. 26 is an example of the display screen displayed in the display unit 109 according to the present embodiment. Contents of the display screen displayed in the display unit 109 are controlled by the display control unit 107 included in the information processing apparatus 10 according to the present embodiment.

As shown in FIG. 26, the display screen mainly includes an edit preview display area to confirm editing contents concerning a template, content selection area, template selection area, color arrangement pattern selection area, and color arrangement display area.

In the content selection area, a list of content that can be used by the information processing apparatus 10 is displayed together with, for example, thumbnail images. In the template selection area, templates stored in the information processing apparatus 10 are displayed together with, for example, thumbnail images. Templates associated with the color arrangement mood corresponding to the content are preferentially displayed mainly in the template selection area. In the color arrangement pattern selection area, color arrangement patterns associated with the template are displayed. In the color arrangement display area, color arrangement patterns selected in the color arrangement pattern selected area are displayed.

When the content selection area is operated by a user's operation to select some piece of content, the layout setting unit 163 determines the template (default template) set to the selected content. Then, the layout setting unit 163 notifies the display control unit 107 of information about the set template and content and the display control unit 107 displays the content in the edit preview display area by using the notified template. That is, when the content is first displayed in the display screen, the default template is displayed in a selected state in the template selection area and the default color arrangement pattern is displayed in a selected state in the color arrangement pattern selection area.

The user can change the color arrangement patterns assigned to the ID1 to ID3 of a template by changing the order of color arrangement patterns displayed in the color arrangement display area. Moreover, by operating the template selection area or the color arrangement pattern selection area, setting values thereof can be changed when appropriate.

If the template setting is to the user's liking, the user can update contents of the content DB 153 with various settings displayed in the current display screen by clicking an object labeled as "Save".

In the foregoing, an example of the GUI provided by the information processing apparatus 10 according to the present embodiment has been described by showing a concrete example with reference to FIG. 26.

<Information Processing Method>

Figure 27:
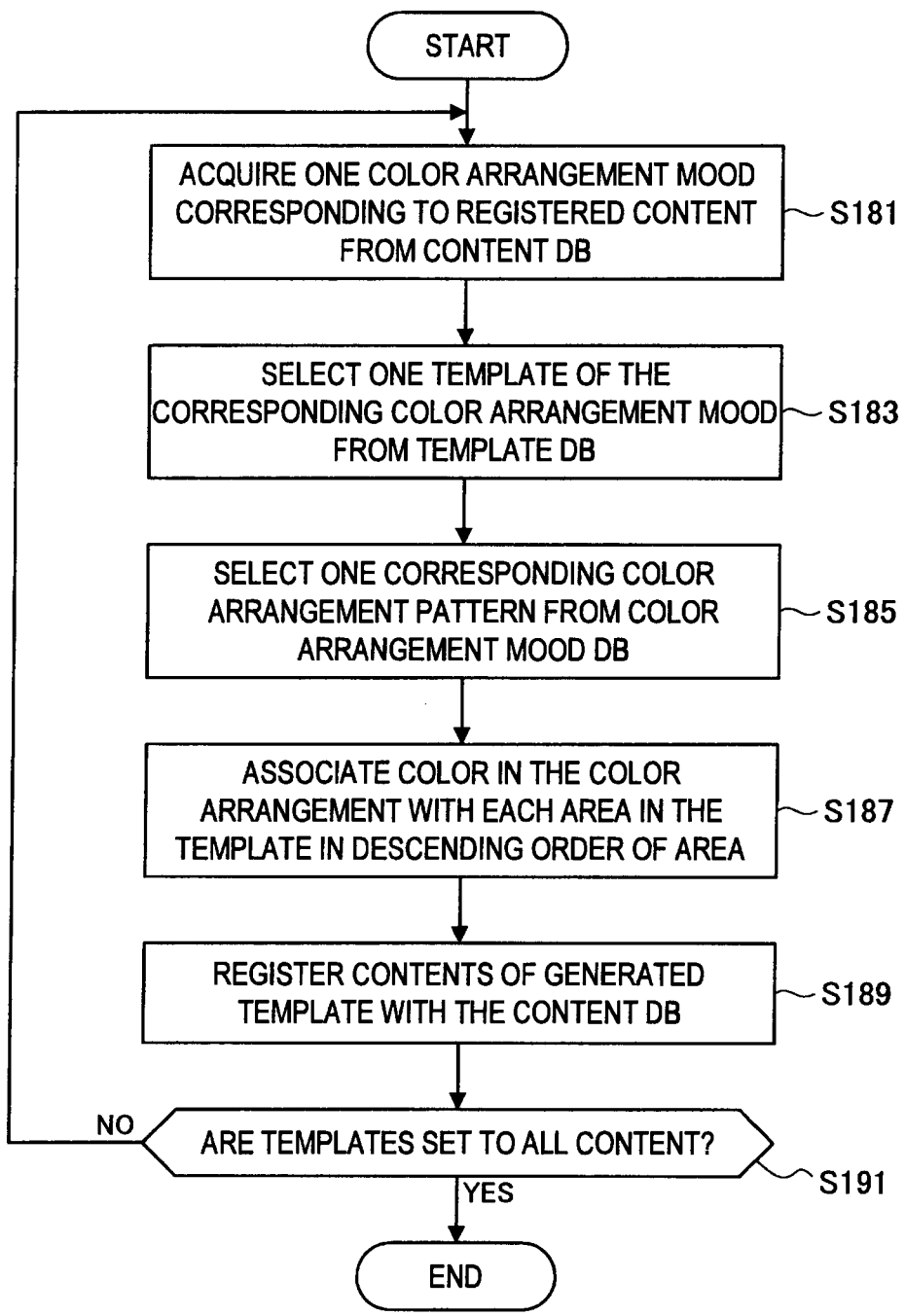
FIG. 27 is a flow chart showing the flow of the information processing method according to the embodiment.

Subsequently, the flow of the information processing method (template setting method) executed by an information processing apparatus according to the present embodiment will be described with reference to FIG. 27. FIG. 27 is a flow chart showing the flow of the information processing method according to the present embodiment.

Before starting the description below, it is assumed that the color arrangement mood as metadata of content is already associated by the processing illustrated in FIG. 20 in the second embodiment in the content DB 153 stored in the storage unit 111.

First, the template setting unit 161 of the information processing apparatus 10 acquires one color arrangement mood corresponding to registered content from the content DB 153 (step S181). Then, the template setting unit 161 selects one template corresponding to the acquired color arrangement mood from the template DB 165 (step S183). The selected template becomes the default template of the focused content.

Subsequently, the template setting unit 161 selects one corresponding color arrangement pattern from the color arrangement DB 151 by referring to the color arrangement mood DB 151 (step S185). The selected color arrangement pattern becomes the default color arrangement pattern of the default template.

Then, the template setting unit 161 associates the color in the color arrangement with each area in the template, for example, in descending order of area (step S187). The layout including the color arrangement of the template displayed automatically when the focused content is selected is thereby decided.

Subsequently, the template setting unit 161 registers contents of the generated template with the content DB 153 (step S189).

Then, the template setting unit 161 determines whether the template has been set for all content (step S191). If the template has not yet been set for all content, the template setting unit 161 returns to step S181 to continue the processing for content for which no template is set. If the template has been set for all content, the template setting unit 161 terminates the processing.

In the foregoing, an example of the flow of the information processing method executed by the information processing apparatus 10 according to the present embodiment has been described with reference to FIG. 27.

Thus, in the information processing apparatus 10 and an information processing method according to the present embodiment, template setting processing set manually in the past can automatically be performed. Also in the information processing apparatus 10 according to the present embodiment, the template and color arrangement suitable for content can automatically be set. Further, the user can easily switch/replace the template and color arrangement suitable for content by providing GUIs shown in FIG. 26.

Fourth Embodiment

The information processing apparatus 10 according to the first to third embodiments can also be realized as a mobile terminal including a touch panel as an input apparatus. A case in which the information processing apparatus 10 according to the first to third embodiments is implemented in a mobile terminal including a touch panel will be described below.

<Configuration of the Information Processing Apparatus>
[External Appearance of the Information Processing Apparatus]

Figure 28:
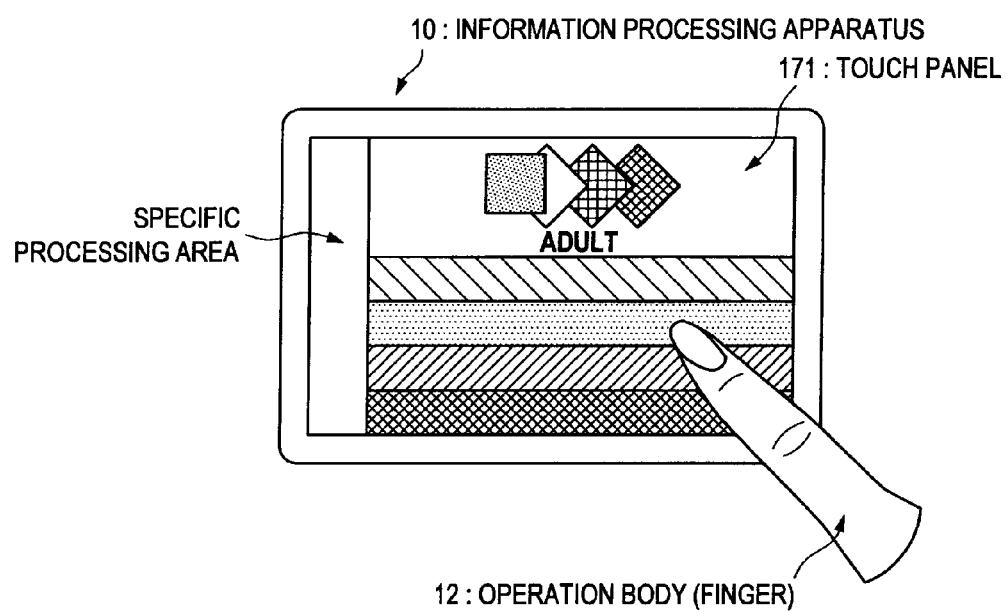
FIG. 28 is an explanatory view exemplifying the information processing apparatus according to a fourth embodiment of the present invention.

First, the external appearance of an information processing apparatus according to the present embodiment will be described with reference to FIG. 28. FIG. 28 is an explanatory view exemplifying the information processing apparatus according to the present embodiment.

As shown in FIG. 28, a display unit 109 including a touch panel 171 (hereinafter, abbreviated as the touch panel 171) is provided in the information processing apparatus 10. In the touch panel 171, as shown in FIG. 28, the display screen as described in the first to third embodiments is displayed. Predetermined processing such as scrolling is performed on various kinds of information displayed in the touch panel 171 in accordance with contact or movement of an operation body 12. A special processing area may be provided in the touch panel 171. In the special processing area, for example, an object such as an icon to perform predetermined processing is displayed and the predetermined processing associated with the displayed object is performed by the special display area being selected.

The information processing apparatus 10 is not limited to performing only predetermined processing such as the selection of an object or movement of display contents in response to contact or movement of the operation body 12. If, for example, the operation body 12 moves by drawing a predetermined locus in a state in which the operation body 12 is in contact with the touch panel 171, the information processing apparatus 10 performs predetermined processing corresponding to the locus drawn by the operation body 12. That is, the information processing apparatus 10 has a gesture input function. If, for example, a predetermined gesture is input, an application associated with the gesture is activated or predetermined processing associated with the gesture is performed.

As the operation body 12, for example, a finger of the user is used. Or, for example, a stylus or touch pen may also be used as the operation body 12. If the touch panel 171 is of optical type, any object could become the operation body 12. For example, if the touch panel 171 is of optical type, a soft tool such as a brush that is hard to press against the touch panel 171 can also be used as the operation body 12. Further, if the touch panel 171 is an optical touch panel of in-cell type, any object whose shadow is cast on the touch panel 171 can be used as the operation body 12.

The optical touch panel of in-cell type will briefly be described. There are several types of optical touch panels. For example, the optical touch panel of a mode in which an optical sensor is provided in an outer frame of a liquid crystal panel constituting a liquid crystal display and the position and moving direction of the operation body 12 that comes into contact with the liquid crystal panel are detected by the optical sensor is relatively known. In contrast to this mode, the optical touch panel of in-cell type has an optical sensor array mounted in the liquid crystal panel and detects the position and moving direction of the operation body 12 that comes into contact with or comes close to the liquid crystal panel by the optical sensor array.

More specifically, an optical sensor and a lead circuit are formed on a glass substrate of the optical touch panel and a shadow of the operation body 12 is recognized by light incident from outside being detected by the optical sensor and strength thereof being read by the lead circuit. Thus, the optical touch panel of in-cell type can recognize the shape, contact area and the like of the operation body 12 based on the shadow of the operation body 12. Therefore, the operation by the contact "surface", which is deemed difficult to realize by optical touch panels of other types, can be realized. Moreover, by applying optical touch panels of in-cell type, advantages such as improvement of recognition precision, improvement of display quality and further, improvement of designability of liquid crystal displays and the like containing an optical touch panel of in-cell type are gained.

In the configuration of the information processing apparatus 10 in which the touch panel 171 is mounted, for example, the touch panel 171 constituting the information processing apparatus 10 and an arithmetic operation unit that processes position information and the like of the operation body 12 detected by the touch panel 171 may be configured separately. In such a configuration example, processing of data generated in accordance with an operation such as the selection of an object and movement of display contents is performed by the arithmetic operation unit. Thus, the configuration of the information processing apparatus 10 can freely be modified in accordance with the embodiment.

The information processing apparatus 10 according to the present embodiment may be realized as a computer such as a personal computer and various servers or as a mobile electronic device such as a mobile music player, mobile game machine, mobile phone, smart phone, and PDA. Or, the information processing apparatus 10 according to the present embodiment may be realized as a digital video camera, digital still camera, or car navigation system.

[Example of the Configuration of the Information Processing Apparatus]

Figure 29:
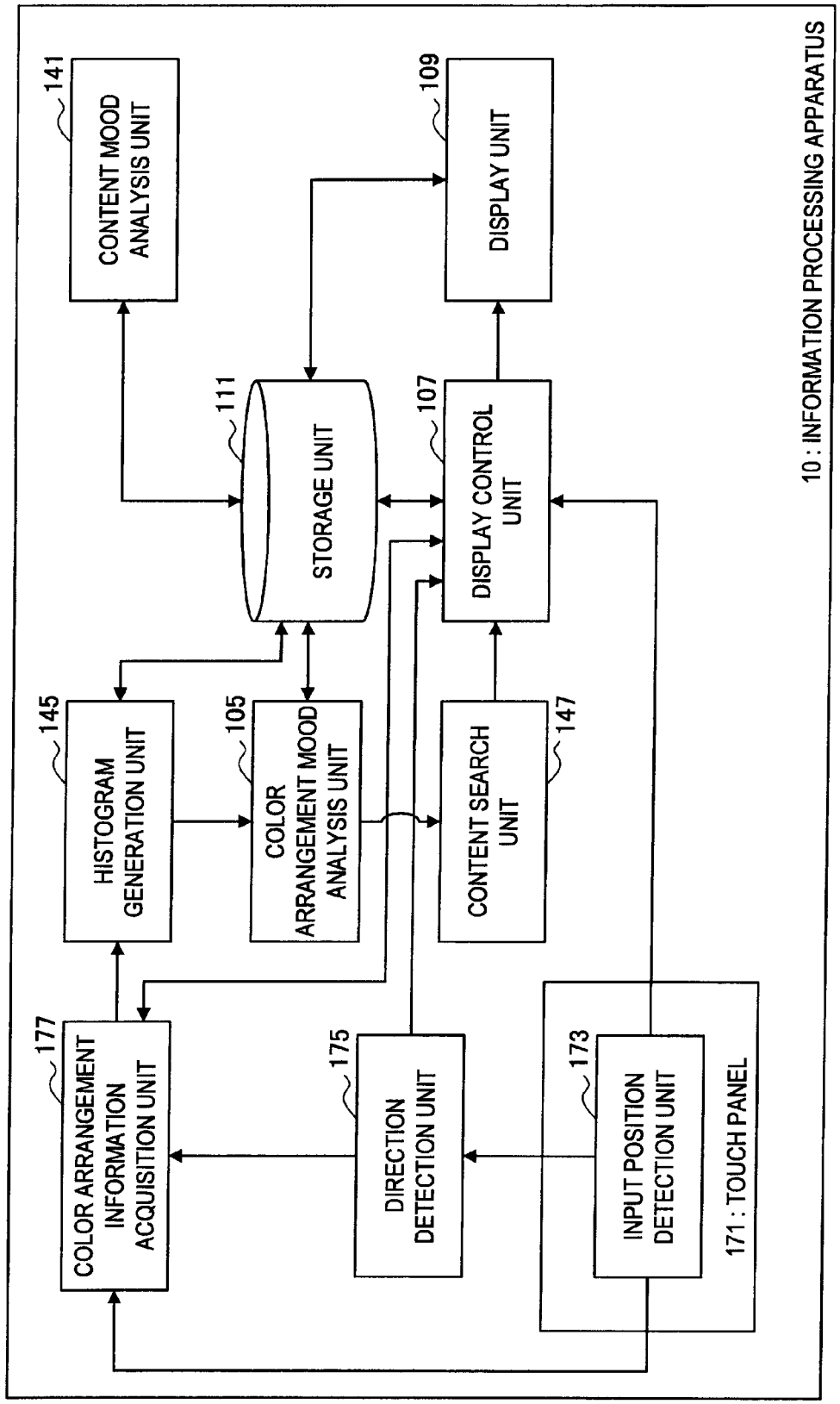
FIG. 29 is a block diagram showing the configuration of the information processing apparatus according to the embodiment.

Next, an example of the configuration of the information processing apparatus 10 according to the present embodiment will be described in detail with reference to FIG. 29. FIG. 29 is a block diagram showing the configuration of an information processing apparatus according to the present embodiment. In FIG. 29, a case when the information processing apparatus 10 according to the second embodiment includes the touch panel 171 is illustrated.

The information processing apparatus 10 according to the present embodiment includes, for example, as shown in FIG. 29, the color arrangement mood analysis unit 105, the display control unit 107, the display unit 109, the storage unit 111, the content mood analysis unit 141, the histogram generation unit 145, and the content search unit 147. The information processing apparatus 10 according to the present embodiment also has the touch panel 171 and further includes an input position detection unit 173, a direction detection unit 175, and a color arrangement information acquisition unit 177.

The color arrangement mood analysis unit 105, the display control unit 107, the display unit 109, the storage unit 111, the content mood analysis unit 141, the histogram generation unit 145, and the content search unit 147 have the same configuration as that of the respective units in the second embodiment and achieve similar operations and thus, a detailed description thereof is omitted below.

The touch panel 171 is an operation/input unit provided in the information processing apparatus 10 according to the present embodiment. The touch panel 171 may be an optical touch panel described above or an optical touch panel of in-cell type. The touch panel 171 may be formed integrally with the display unit 109 such as a display device included in the information processing apparatus 10 or separately. The touch panel 171 further includes the input position detection unit 173.

The input position detection unit 173 detects the position of the touch panel 171 touched by the operation body 12. The input position detection unit 173 may be configured to be able to detect a pressing force applied to the touch panel 171 when being touched by the operation body 12. The input position detection unit 173 may have a function to be able to detect the presence of the operation body 12 in a space over the touch panel 171 and close to the touch panel 171 even if the operation body 12 is not directly in contact and to recognize as a contact position. That is, the contact position here may contain position information for an operation performed by the operation body 12 as if to draw in the air over the screen of the touch panel 171.

Figure 30A:
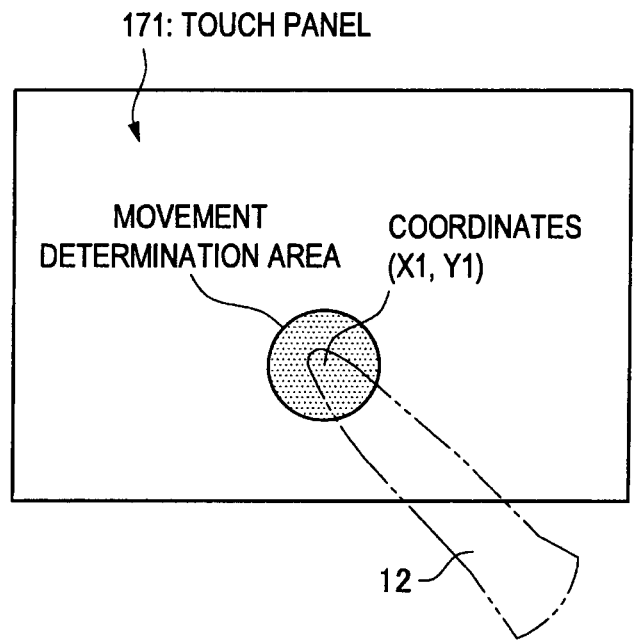
FIG. 30A is an explanatory view illustrating the information processing apparatus according to the embodiment.

The input position detection unit 173 outputs information about the detected contact position (more specifically, coordinates of the contact position) to the direction detection unit 175 and the color arrangement information acquisition unit 177 as input position information. If, for example, as shown in FIG. 30A, the number of detected contact positions is one, the input position detection unit 173 outputs one pair of coordinates (X1, Y1) as input position information. If the number of detected contact positions is two, the input position detection unit 173 can output a plurality of detected coordinates.

The direction detection unit 175 is realized by, for example, a CPU, ROM, RAM, and the like. The direction detection unit 175 detects the moving direction of the operation body 12 by using coordinates, which are input position information output from the input position detection unit 173.

More specifically, the direction detection unit 175 detects the moving direction of the operation body 12 based on changes in input position information output at predetermined time intervals (for example, every several milliseconds to several hundred milliseconds). For example, as shown in FIG. 30A, the direction detection unit 175 has a movement determination area used for determining whether the operation body 12 is moving set thereto. The movement determination area can be set to any dimensions depending on performance of resolution or the like that can distinguish two adjacent contact positions in the touch panel 171 and can be set to, for example, a radius of about 10 pixels. If the transmitted input position information changes beyond the range of the movement determination area, the direction detection unit 175 determines that the operation body 12 has moved. If the transmitted input position information changes within the range of the movement determination area, the direction detection unit 175 can determine that a so-called tapping operation has been performed by the operation body 12. The determination whether the operation body 12 has moved is made for all input position information transmitted in the same timing. That is, if two pairs of coordinates are transmitted in the same timing as input position information, the direction detection unit 175 makes the determination described above for temporal changes of each of the two pairs of coordinates.

If the transmitted input position information changes beyond the range of the movement determination area, the direction detection unit 175 detects the direction of a vector formed by a locus drawn by the transmitted input position information with temporal changes as the moving direction. The magnitude of the vector becomes the amount of movement of the operation body 12.

Figure 30B:
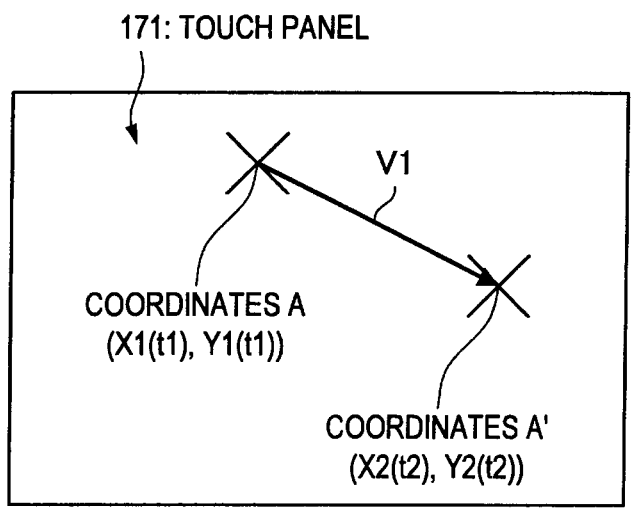
FIG. 30B is an explanatory view illustrating the information processing apparatus according to the embodiment.

Consider, for example, as shown in FIG. 30B, a case when coordinates A (X1 (t1), Y1 (t1)) are transmitted from the input position detection unit 173 at time t1 and the position at time t2 corresponding to the input position information is coordinates A' (X2 (t2), Y2 (t2)). In this case, the direction detection unit 175 detects the direction represented by a vector V1 defined by the start coordinates A and the end coordinates A' as the moving direction of the operation body 12 that has touched the coordinates A. The direction detection unit 175 also sets the magnitude of the vector V1 as the amount of movement of the operation body 12.

The direction detection unit 175 can calculate the movement speed of the operation body 12 by using the detected amount of movement of the operation body 12 and a time difference. Further, the direction detection unit 175 can also calculate the acceleration of the operation body 12 by using calculated movement speeds and a time difference. By focusing on the movement speed or acceleration, whether an operation performed by the operation body 12 is a so-called flick operation (operation to flick the touch panel) can be determined.

The direction detection unit 175 transmits direction information containing the moving direction and amount of movement of the operation body 12 detected as described above to the color arrangement information acquisition unit 177.

The color arrangement information acquisition unit 177 acquires information (color arrangement information) about the combination of colors to be search conditions (search query) when the content search unit 147 searches for content based on information about display contents acquired from the display control unit 107 and displayed in the display unit 109 and various kinds of information output by the input position detection unit 173 and the direction detection unit 175.

The function of the color arrangement information acquisition unit 177 according to the present embodiment is the same as that of the color arrangement information acquisition unit 177 according to the second embodiment of the present invention and achieves similar operations. Therefore, a detailed description thereof is omitted below.

The information processing apparatus 10 according to the present embodiment may be realized as a computer such as a personal computer and various servers or as a mobile electronic device such as a mobile music player, mobile game machine, mobile phone, smart phone, and PDA. Or, the information processing apparatus 10 according to the present embodiment may be realized as a digital video camera, digital still camera, or car navigation system.

While the above description has described a case in which the touch panel 171 is implemented in the information processing apparatus 10 according to the second embodiment, the touch panel 171 can similarly be implemented in the information processing apparatus 10 according to the first and third embodiments.

In the foregoing, an example of the function of the information processing apparatus 10 according to the present embodiment has been shown. Each of the above structural elements may be configured by using common members or circuits or hardware specialized to the function of each structural element. Or, the function of each structural element may all be executed by a CPU or the like. Therefore, elements to be used can be changed when appropriate in accordance with the technical level when the present invention is carried out.

A computer program to realize each function of an information processing apparatus according to the present embodiment described above may be created and implemented on a personal computer or the like. Or, a computer readable recording medium in which such a computer program is stored may be provided. The recording medium is, for example, a magnetic disk, optical disk, magneto-optical disk, or flash memory. The above computer program may be delivered via, for example, a network without using any recording medium.

<Example of the Display Screen>

Subsequently, an example of the display screen of the information processing apparatus 10 according to the present embodiment will be described with reference to FIGS. 31 to 34. FIGS. 31 to 34 are explanatory views illustrating an information processing apparatus according to the present embodiment.

Figure 31:
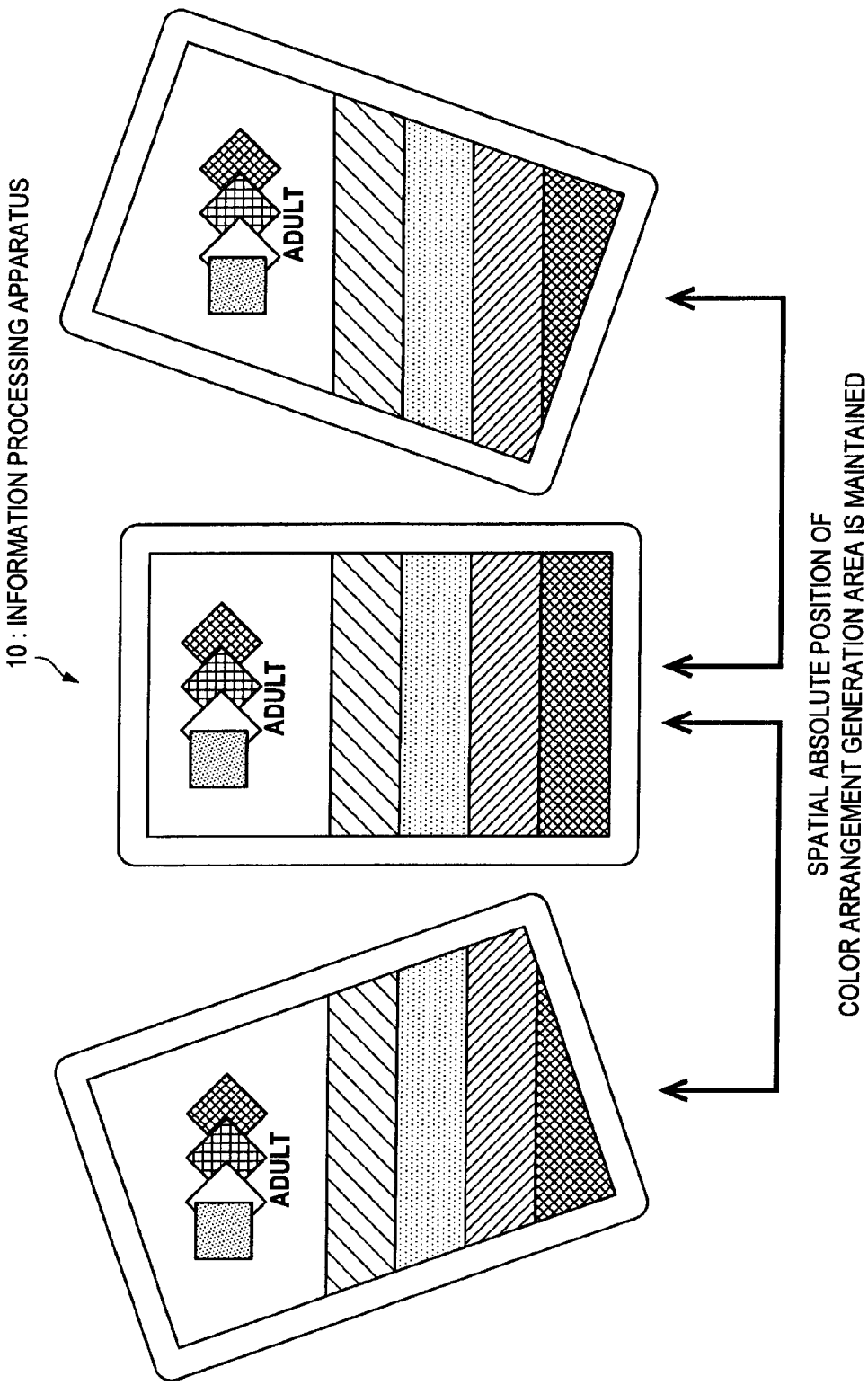
FIG. 31 is an explanatory view exemplifying the display screen of the information processing apparatus according to the embodiment.

A mobile electronic device including the touch panel 171 as illustrated in FIG. 28 may be provided with a device capable of estimating the posture of the device such as a gyro sensor and acceleration sensor. In such a case, as shown in FIG. 31, the display control unit 107 of the information processing apparatus 10 may control the display screen so that the color arrangement generation area is horizontal in an absolute space all the time.

Figure 32:
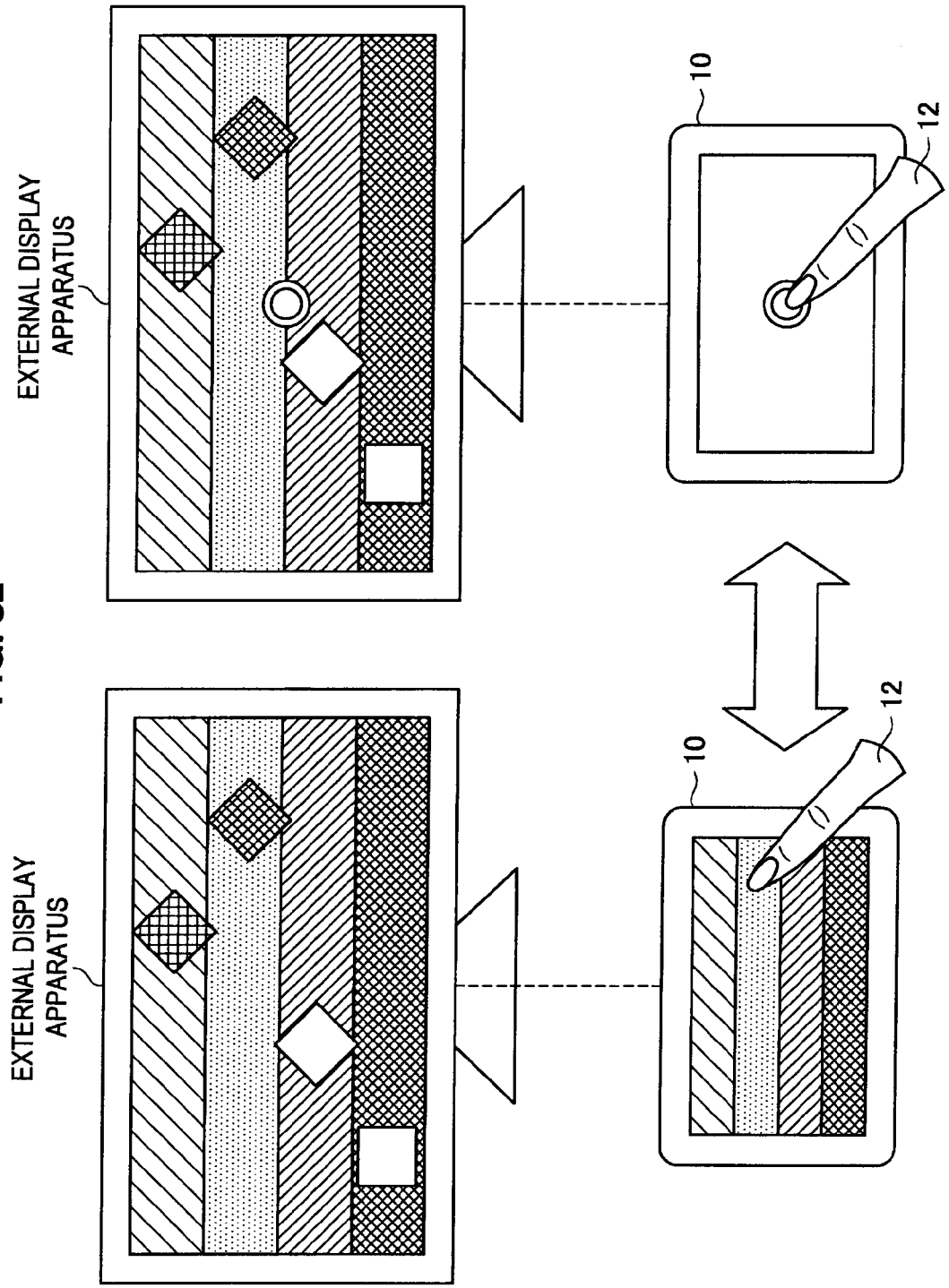
FIG. 32 is an explanatory view illustrating the information processing apparatus according to the embodiment.
Figure 33:
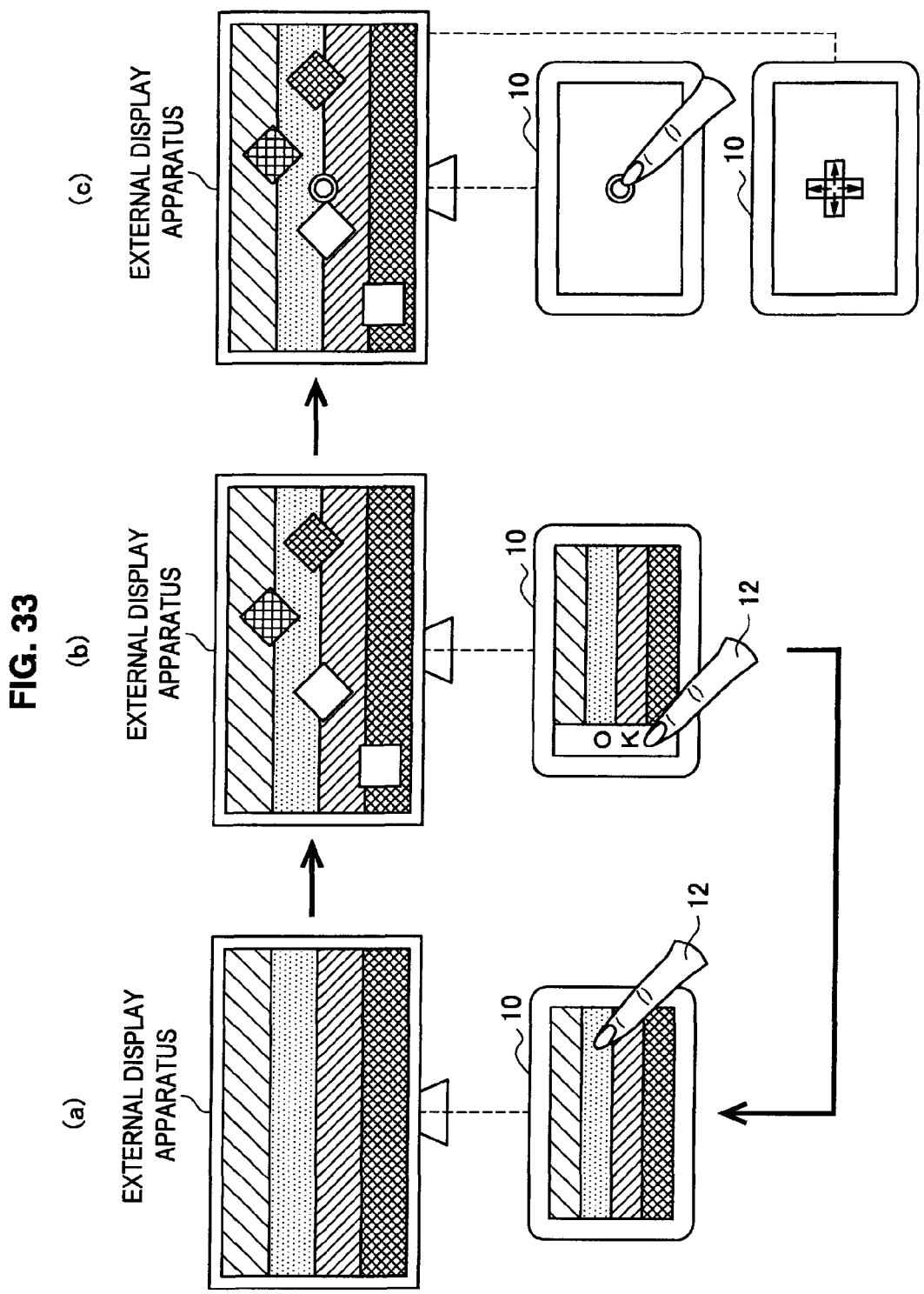
FIG. 33 is an explanatory view illustrating the information processing apparatus according to the embodiment.

A mobile electronic device including the touch panel 171 as illustrated in FIG. 28 may also be used as a remote controller of an external display apparatus such as a TV set. Assume, for example, as shown in FIG. 32, that the information processing apparatus 10 can communicate with an external display apparatus by wire or wirelessly using a communication apparatus included in the local apparatus and the information processing apparatus 10 can provide the function shown in the second embodiment. The user of the information processing apparatus 10 may operate the information processing apparatus 10 to cause the external display apparatus to display search results thereof.

As shown in the left figure of FIG. 32, the user of the information processing apparatus 10 causes the external display apparatus to display search results thereof by operating the touch panel & display unit of the information processing apparatus 10 to perform a predetermined operation for a content search. After search results are displayed in the external display apparatus, as shown in the right figure of FIG. 32, a search result displayed in the external display apparatus can be selected by using the information processing apparatus 10 as a pointing device.

More specifically, as shown in FIG. 33A, the user operates the touch panel & display unit of the information processing apparatus 10. When a predetermined time passes or a search key to start search processing is selected, as shown in FIG. 33B, search results are displayed in the external display apparatus. If the user operates a specific processing area displayed in the display screen of the information processing apparatus 10 to confirm search results, as shown in FIG. 33C, the information processing apparatus 10 is available as a pointing device. At this point, a cross key as shown in the lower part of FIG. 33C may be displayed in the display unit of the information processing apparatus 10 as a GUI. On the other hand, if the user does not confirm search results in FIG. 33B, search processing will continue by returning to FIG. 33A.

Figure 34:
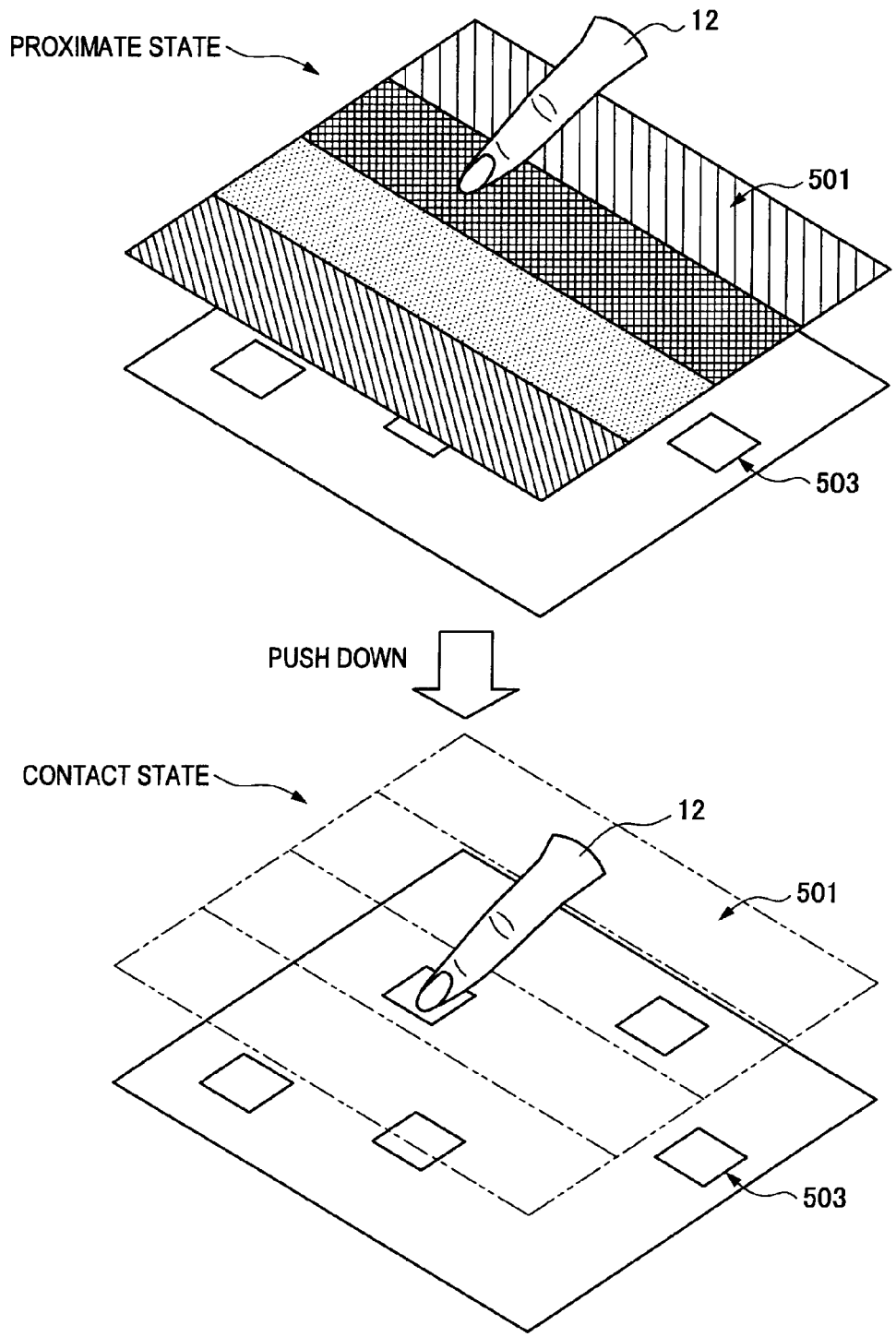
FIG. 34 is an explanatory view illustrating the information processing apparatus according to the embodiment.

If the touch panel 171 included in the information processing apparatus 10 is capable of detecting proximity or contact of an operation body, a user interface as shown in FIG. 34 can be realized by distinguishing a proximate state and a contact state of the operation body.

That is, the display control unit 107 of the information processing apparatus 10 in such a case lays out the display screen so that search result display area and the color arrangement generation area are displayed in a superimposed state. Then, when, as shown in the upper part of FIG. 34, the operation body 12 is in a proximate state, the information processing apparatus 10 determines that the operation body 12 is operating the scroll bar 501. In this case, the scroll bar 501 being operated is displayed differently from the other scroll bars 501 that are not being operated (for example, the scroll bar 501 being operated is displayed opaquely while the other scroll bars 501 translucently).

When, as shown in the lower part of FIG. 34, the operation body 12 is in a contact state, the information processing apparatus 10 determines that the operation body 12 is operating the object 503 such as an icon representing content.

By realizing such an interface, the information processing apparatus 10 according to the present embodiment can further improve user convenience.

The information processing apparatus 10 according to the present embodiment can similarly be realized in a so-called touch screen tablet.

(Hardware Configuration)

Figure 35:
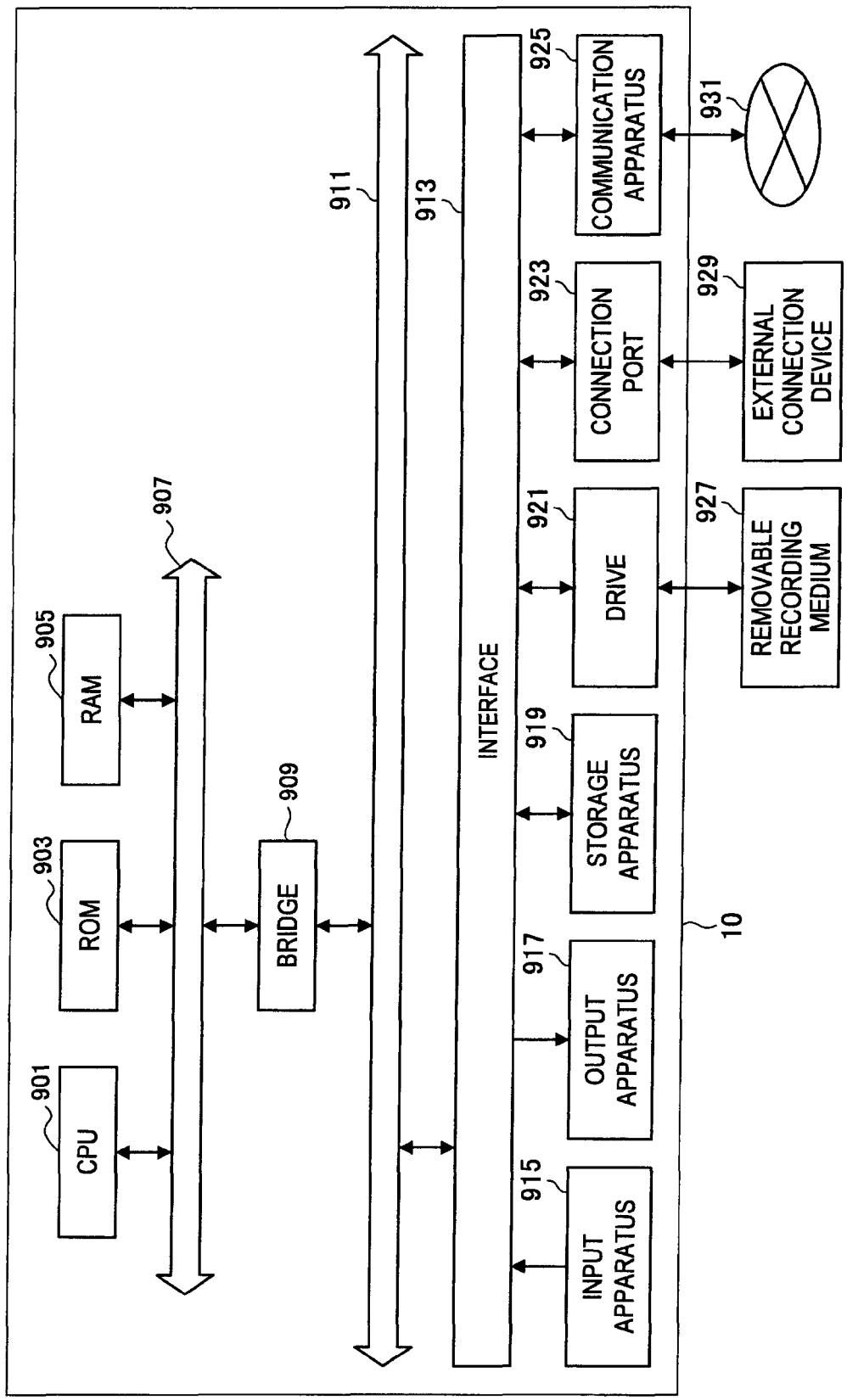
FIG. 35 is a block diagram showing a hardware configuration of the information processing apparatus according to the embodiment.

Next, the hardware configuration of the information processing apparatus 10 according to the embodiment of the present invention will be described in detail with reference to FIG. 35. FIG. 35 is a block diagram for illustrating the hardware configuration of the information processing apparatus 10 according to the embodiment of the present invention.

The information processing apparatus 10 mainly includes a CPU 901, a ROM 903, and a RAM 905. Furthermore, the information processing apparatus 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

(Summary)

As described above, an information processing apparatus according to the embodiments of the present invention generates a color histogram used for color arrangement mood analysis of content by using color arrangement information about the combination of colors so that an input image can be analyzed more accurately.

Also an information processing apparatus according to the embodiments of the present invention can search for content and set a template automatically by further using an abstract matter of a color arrangement mood obtained as a result of analysis.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-086998 filed in the Japan Patent Office on Apr. 5, 2010, the entire content of which is hereby incorporated by reference.

What is claimed is:

1. An information processing apparatus, comprising:
    a storage unit in which a color arrangement database recording correspondences between color arrangement information about a combination of colors and a color arrangement mood concerning an atmosphere provided by the combination of colors is stored; and
    a color arrangement mood analysis unit that analyzes input color arrangement information based on the color arrangement database to determine the color arrangement mood corresponding to the combination of colors represented by the input color arrangement information,
        wherein the color arrangement mood analysis unit calculates an index indicating a degree of similarity between the input color arrangement information and the color arrangement information stored in the color arrangement database, and
        the color arrangement mood associated with the color arrangement information closest to the input color arrangement information and stored in the color arrangement database is set as the color arrangement mood corresponding to the combination of colors represented by the input color arrangement information.

2. The information processing apparatus according to claim 1, further comprising:
    a histogram generation unit that generates, based on an input image, a histogram representing the combination of colors contained in the image,
        wherein the color arrangement mood analysis unit uses the histogram generated by the histogram generation unit as the input color arrangement information.

3. The information processing apparatus according to claim 2, further comprising:
    an attention value calculation unit that calculates an attention value indicating the degree of the color contained in the input image to attract attention of a user; and
    a subtractive color processing unit that reduces a number of colors contained in the input image to a predetermined number of colors,
        wherein the histogram generation unit generates the histogram by a convolution of the input image whose number of colors has been reduced by the subtractive color processing unit and the attention value calculated by the attention value calculation unit.

4. The information processing apparatus according to claim 1,
    wherein predetermined content and atmosphere information indicating an atmosphere provided by the content to a user are associated and stored in the storage unit, further comprising:
    a color arrangement mood selection unit that selects one or a plurality of color arrangement moods corresponding to the input color arrangement information based on the index indicating the degree of the similarity calculated by the color arrangement mood analysis unit; and
    a content selection unit that selects the content stored in the storage unit based on the one or the plurality of color arrangement moods selected by the color arrangement mood selection unit.

5. The information processing apparatus according to claim 4,
    wherein a mood conversion database recording correspondences between the atmosphere information indicating the atmosphere provided by the content to the user and the color arrangement mood is stored in the storage unit, and
    the content selection unit selects the content by using the mood conversion database.

6. An information processing method, comprising the steps of:
    analyzing input color arrangement information based on a color arrangement database recording correspondences between the color arrangement information about a combination of colors and a color arrangement mood concerning an atmosphere provided by the combination of colors,
        wherein the analyzing includes calculating an index indicating a degree of similarity between the input color arrangement information and the color arrangement information stored in the color arrangement database; and
    determining the color arrangement mood corresponding to the combination of colors represented by the input color arrangement information,
        wherein the color arrangement mood associated with the color arrangement information closest to the input color arrangement information and stored in the color arrangement database is set as the color arrangement mood corresponding to the combination of colors represented by the input color arrangement information.

7. A non-transitory, computer readable storage medium storing a program that, when executed by a computer, causes the computer to perform a method, the method comprising:
    analyzing input color arrangement information based on a color arrangement database recording correspondences between the color arrangement information about a combination of colors and a color arrangement mood concerning an atmosphere provided by the combination of colors,
        wherein the analyzing includes calculating an index indicating a degree of similarity between the input color arrangement information and the color arrangement information stored in the color arrangement database; and
    determining the color arrangement mood corresponding to the combination of colors represented by the input color arrangement information,
        wherein the color arrangement mood associated with the color arrangement information closest to the input color arrangement information and stored in the color arrangement database is set as the color arrangement mood corresponding to the combination of colors represented by the input color arrangement information.

* * * * *